United States Patent
Long et al.

(10) Patent No.: US 7,200,278 B2
(45) Date of Patent: Apr. 3, 2007

(54) 4×4 PIXEL-BASED EDGE DETECTION AND EDGE ENHANCEMENT WITHOUT LINE BUFFER OVERHEAD

(75) Inventors: Wai Khaun Long, San Jose, CA (US); Jin Ji, Sunnyvale, CA (US)

(73) Assignee: Huaya Microelectronics, Ltd, San Jose, CA (US)

( * ) Notice: Subject to any disclaimer, the term of this patent is extended or adjusted under 35 U.S.C. 154(b) by 796 days.

(21) Appl. No.: 10/390,139

(22) Filed: Mar. 14, 2003

(65) Prior Publication Data

US 2004/0184668 A1 Sep. 23, 2004

(51) Int. Cl.
G06K 9/40 (2006.01)
G06K 9/32 (2006.01)
G06K 9/48 (2006.01)

(52) U.S. Cl. .................................. 382/266; 382/298

(58) Field of Classification Search ................ 382/298, 382/299, 300, 293, 295, 296, 266–269, 199, 382/205, 195, 197; 345/606, 609, 649, 660, 345/665; 358/525
See application file for complete search history.

(56) References Cited

U.S. PATENT DOCUMENTS

| | | | | |
|---|---|---|---|---|
| 5,054,100 A | * | 10/1991 | Tai | 382/300 |
| 6,943,805 B2 | * | 9/2005 | Snyder et al. | 345/589 |
| 2003/0053702 A1 | * | 3/2003 | Hu | 382/238 |
| 2003/0076515 A1 | * | 4/2003 | Schuppan | 358/1.9 |
| 2003/0189579 A1 | * | 10/2003 | Pope | 345/660 |
| 2004/0190792 A1 | * | 9/2004 | Slavin | 382/299 |
| 2006/0093232 A1 | * | 5/2006 | Yang et al. | 382/254 |

* cited by examiner

*Primary Examiner*—Yon J. Couso
(74) *Attorney, Agent, or Firm*—Silicon Valley Patent Group; Edward S. Mao

(57) ABSTRACT

A digital image upscaling system enhances the visual quality of enlarged images by detecting diagonal edges and applying an appropriate scaling algorithm, such as a rotated bilinear scaling process, to output pixels associated with those edges. The rotated bilinear scaling process involves detecting diagonal edges and specifying a new frame of reference rotated 45° from the original frame of reference, and then selecting a rotated pixel set based on the new frame of reference. Bilinear interpolation in the new frame of reference using the rotated pixel set provides improved pixel data for the output pixel. Output pixels found not to be associated with diagonal edges are processed using standard bilinear interpolation.

27 Claims, 24 Drawing Sheets

4×4 PIXEL-BASED EDGE DETECTION AND EDGE ENHANCEMENT WITHOUT LINE BUFFER OVERHEAD

FIELD OF THE INVENTION

This invention relates generally to digital imaging, and more particularly to a method and system for efficiently scaling up digital images while maintaining visual quality.

BACKGROUND OF THE INVENTION

A digital image is made up of a fixed number of pixels, typically in a rectangular array having a specified number of rows and columns. Each pixel is associated with pixel data that specifies visual characteristics for that pixel, such as color, luminosity, hue, or saturation. These visual characteristics define the content of the digital image. For example, FIG. 1a shows a sample digital image 100 that includes a dark triangle 120 on a light background 110. A magnified view of a portion A of the diagonal edge of triangle 120 is shown in FIG. 1b, revealing the rectangular array (rows and columns) of pixels forming digital image 100. Background 110 is formed by a plurality of light pixels 111, while triangle 120 is formed by a plurality of dark pixels 121. Note that pixels 111 and 121 are not intrinsically different, but only differ in their assigned pixel data. Therefore, modification of digital image 100 simply involves changing the pixel data associated with pixels 111 and 121.

When upscaling (i.e., enlarging or scaling up) a digital image, such as digital image 100, the original pixels cannot simply be copied into more widely spaced positions. Such an approach would produce a washed out image due to the inter-pixel gaps formed by the increased spacing. Therefore, an interpolation process is required to generate new pixels that fill the gaps in the enlarged image. Typically, it is desirable that the final enlarged image visually resembles the original digital image, so it is critical that the interpolation process minimize any visual distortion. At the same time, the interpolation process should not be so complex that it consumes an excessive amount of computational resources. Any digital image scaling process must carefully balance these two concerns.

For example, a digital image scaling process could simply involve replacing each of the original pixels with an appropriate number of "duplicate" pixels—e.g., a 400% enlargement would mean that each of the original pixels would be replaced by four duplicate pixels. Each duplicate pixel would be a copy of its associated original pixel, so very little computational effort would be required for such an interpolation process. Unfortunately, this type of "direct enlarging" can produce images full of jagged edges and other aesthetically displeasing effects. In particular, diagonal lines experience significant distortion from this type of scaling process, since the enlarged "pixels" create distinct stair-step patterns. For example, FIG. 2 shows a digital image 200 that could be generated from digital image 100 (shown in FIG. 1a) using a direct enlargement technique. Digital image 200 includes a dark scaled triangle 220 on a light background 110. Triangle 220 includes an extremely jagged diagonal edge 221 that results from direct enlargement of the pixels in the original image. This jagged edge significantly detracts from the visual quality of digital image 200.

To reduce the laddering effect shown in FIG. 2, a bilinear interpolation process is often used to generate the pixels for a scaled image. Typically, a scaling operation using bilinear interpolation is performed in a frame of reference matching the orthogonal axes of the pixel array, and can therefore be termed "rectangular bilinear scaling" or "standard bilinear scaling." In a rectangular bilinear scaling process, a "pixel set" of four pixels surrounding the output pixel (interpolated pixel) is used to calculate the scaled pixel data for the output pixel. Since the rectangular bilinear scaling process is aligned with the horizontal and vertical axes of the pixel array, the pixel set forms a square.

For example, FIG. 3 shows a pixel array 300 that includes original pixels A1–A5, B1–B5, C1—C5, D1–D5, and E1–E5. In preparation for a rectangular bilinear scaling procedure, a pixel set 310 is defined to include the four original pixels (pixels B2, B3, C2, and C3) that surround output pixel R1. The location of output pixel R1 relative to pixels B2, B3, C2, and C3, as indicated by offsets p and q. The original pixel data of each of these original pixels can then be weighted according to that pixel's distance from output pixel R1, and then averaged to obtain the scaled pixel data for output pixel R1. Specifically, the scaled pixel data for output pixel R1 can be calculated. A standard bilinear interpolation function as described by the following formula:

$$V(\text{scaled}) = [\,1-q\ \ q\,]\begin{bmatrix} B2 & B3 \\ C2 & C3 \end{bmatrix}\begin{bmatrix} 1-p \\ p \end{bmatrix} \quad (a)$$

By using the bilinear interpolation function of equation (a), some of the harsh distortions and laddering associated with direct enlargement techniques can be avoided since edge transitions are smoothed out and given a more gradual transition.

For example, FIG. 4 shows a digital image 400 that could be generated from digital image 100 (shown in FIG. 1a) using bilinear scaling. Digital image 400 includes a dark scaled triangle 420 on a light background 110. Unlike triangle 220 shown in FIG. 2, triangle 420 is not a monolithic shape, but instead includes transition regions 421, 422, and 423 along its perimeter. Transition regions 421–423 are formed by the rectangular bilinear scaling process used to produce scaled triangle 420, and provide a gradual transition from the dark pixels in the interior of triangle 420 to the light pixels of background 110. This transition between regions results in a softening of any enlarged edges, thereby enhancing the overall visual quality of the enlarged image. However, note that the diagonal edge of triangle 420, while less jagged than the diagonal edge of triangle 220 shown in FIG. 2, still exhibits significant stair-stepping. This is in large part due to the fact that rectangular bilinear scaling is optimized for orthogonal (i.e., horizontal or vertical) edges, since the frame of reference used in the interpolation process is parallel to the horizontal and vertical axes of the pixel array. Features that deviate from these orthogonal axes, such as diagonal edges, are not handled as well by the rectangular bilinear scaling process. As a result, horizontal transition region 421 and vertical transition region 422 form clean transitional edges, while diagonal transition region 423 exhibits the problematic laddering common to conventional scaling techniques. Hence, there is a need for a method and system for improving the visual quality of diagonal edges in upscaled digital images.

SUMMARY

The present invention provides a system and method for improving visual image quality of upscaled digital images by detecting diagonal edges and then applying a scaling process appropriate for those diagonal edges to determine the pixel data for output pixels associated with those edges. According to an embodiment of the invention, a rotated bilinear scaling process can be applied to output pixels associated with a diagonal edge. In a rotated bilinear scaling process, the frame of reference is rotated, which improves the conditions for bilinear interpolation by enabling the selection of a pixel set more closely aligned to those diagonal edges (than a pixel set selected by a rectangular bilinear scaling process). This in turn reduces the amount of laddering in the resulting upscaled image over what would normally be introduced by standard bilinear scaling. The reduced laddering can significantly improve the visual quality of the enlarged image, particularly for images of human faces.

According to an embodiment of the invention, edge detection can be performed by using a weighted matrix to measure a luminance differential across a line of pixels. Multiplying a set of pixels around the output pixel by the weighted matrix provides an edge strength value that can be used to identify and characterize diagonal edges (slope, strength, etc.).

According to another embodiment of the invention, the rotated frame of reference is defined to be oriented 45° offset (either positive or negative 45°) from the original frame of reference, regardless of the exact slope of the diagonal edge. By defining the orientation of the rotated frame of reference in this manner, the complexity of the rotated bilinear scaling process is minimized while still providing a high quality output.

According to another embodiment of the invention, both rectangular bilinear scaling and rotated bilinear scaling are concurrently applied to an original set of pixel data, with the results of the rectangular bilinear scaling operation being assigned to an output pixel if an edge is not detected, and the results of the rotated bilinear scaling operation being assigned to the output pixel if an edge is detected.

The present invention will be more fully understood in view of the following description and drawings.

BRIEF DESCRIPTION OF THE DRAWINGS

FIG. 1b is a detail view of an enlarged portion of the sample digital image of FIG. 1a.

FIG. 2 is a conventional scaled up version of the sample digital image of FIG. 1a.

FIG. 4 is another conventional scaled up version of the sample digital image of FIG. 1a.

DETAILED DESCRIPTION

Figure 1A:
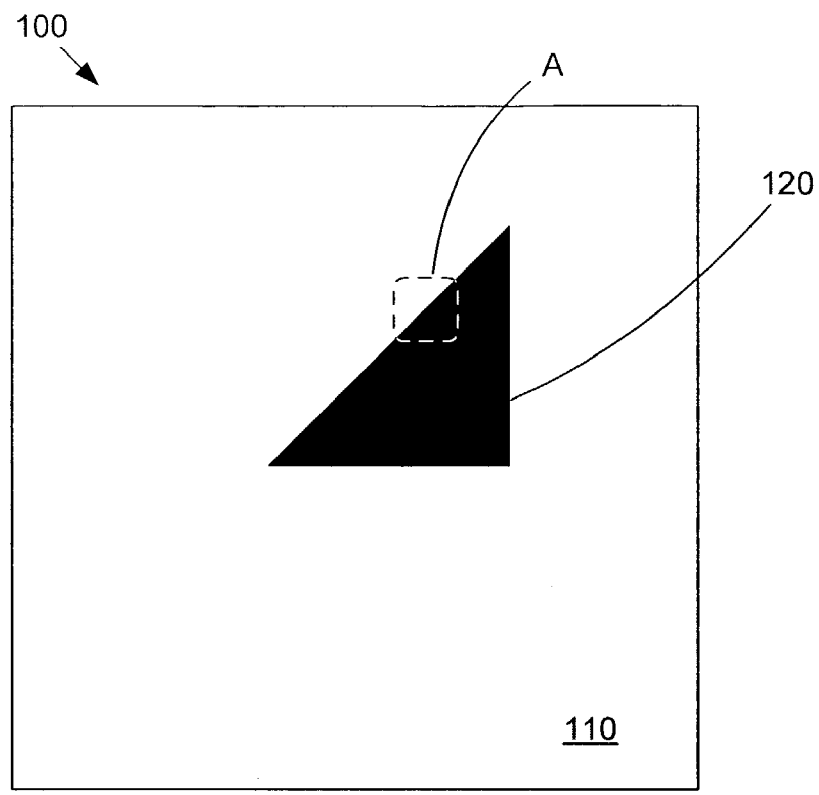
FIG. 1a is a sample digital image.
Figure 1B:
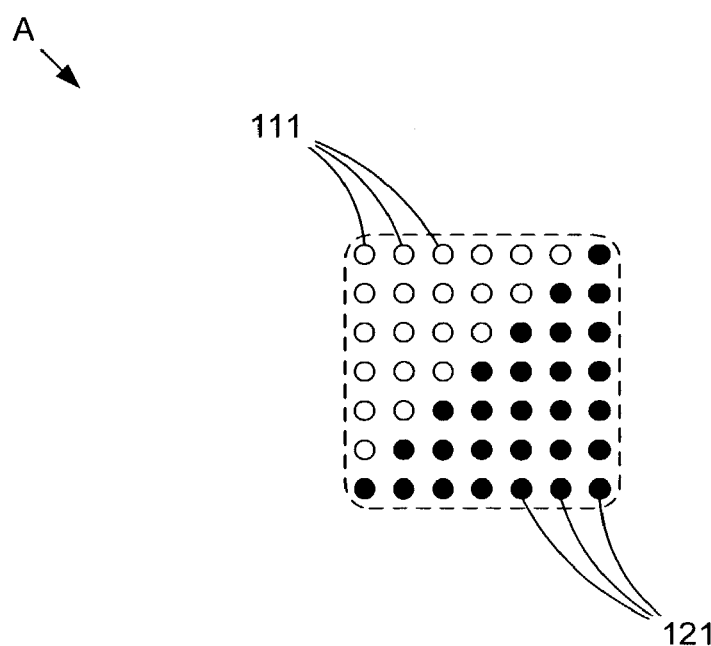
Figure 2:
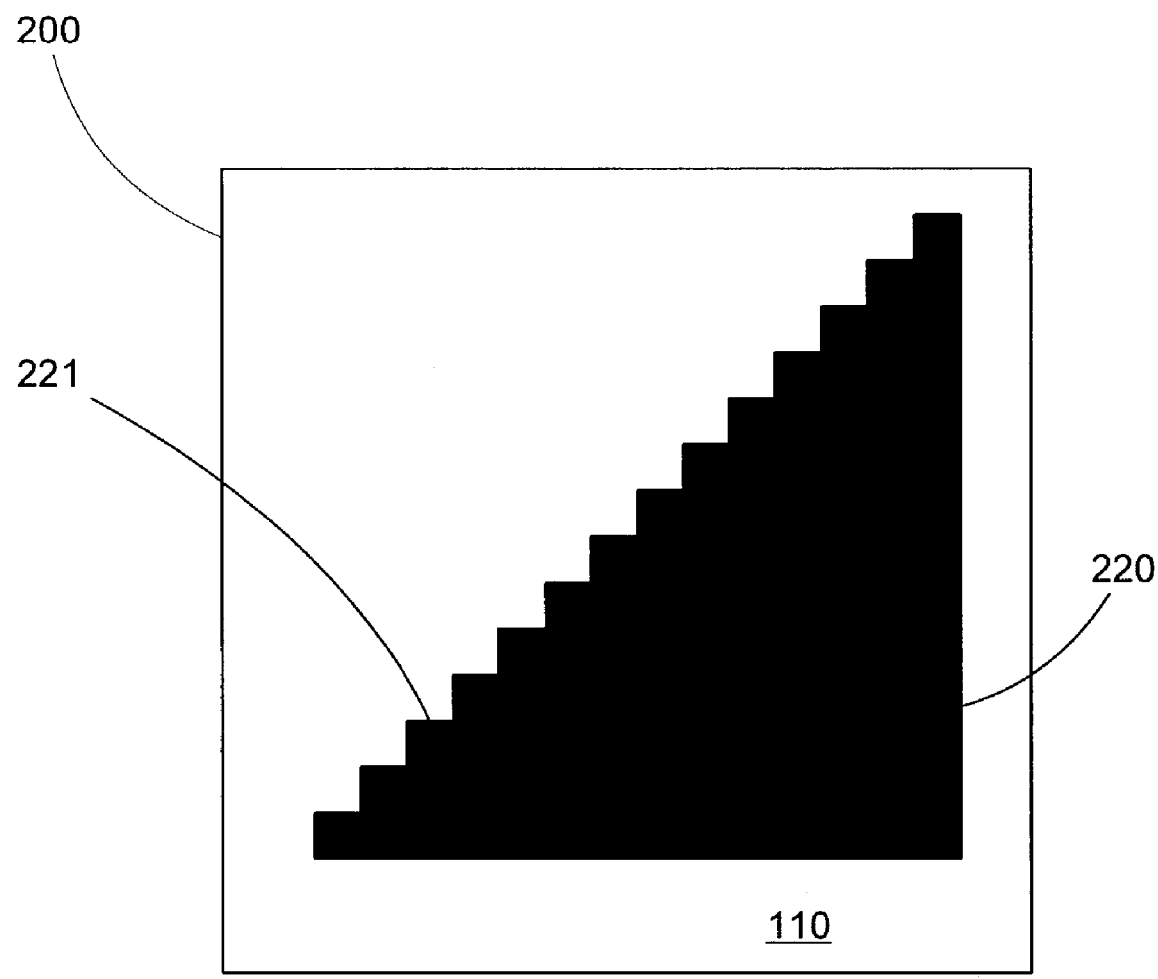
Figure 3:
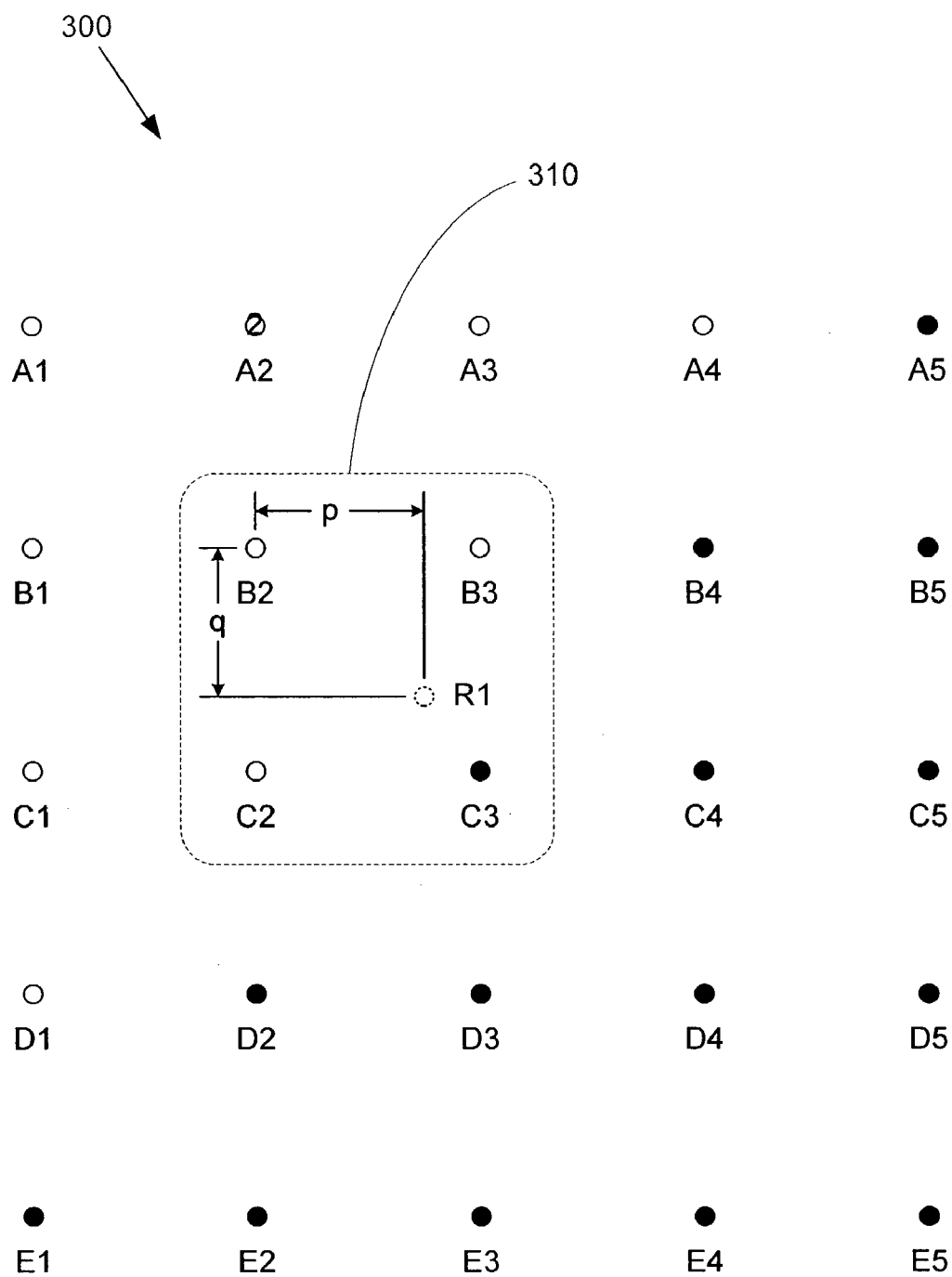
FIG. 3 is a diagram showing the pixels used in a conventional bilinear interpolation process.
Figure 4:
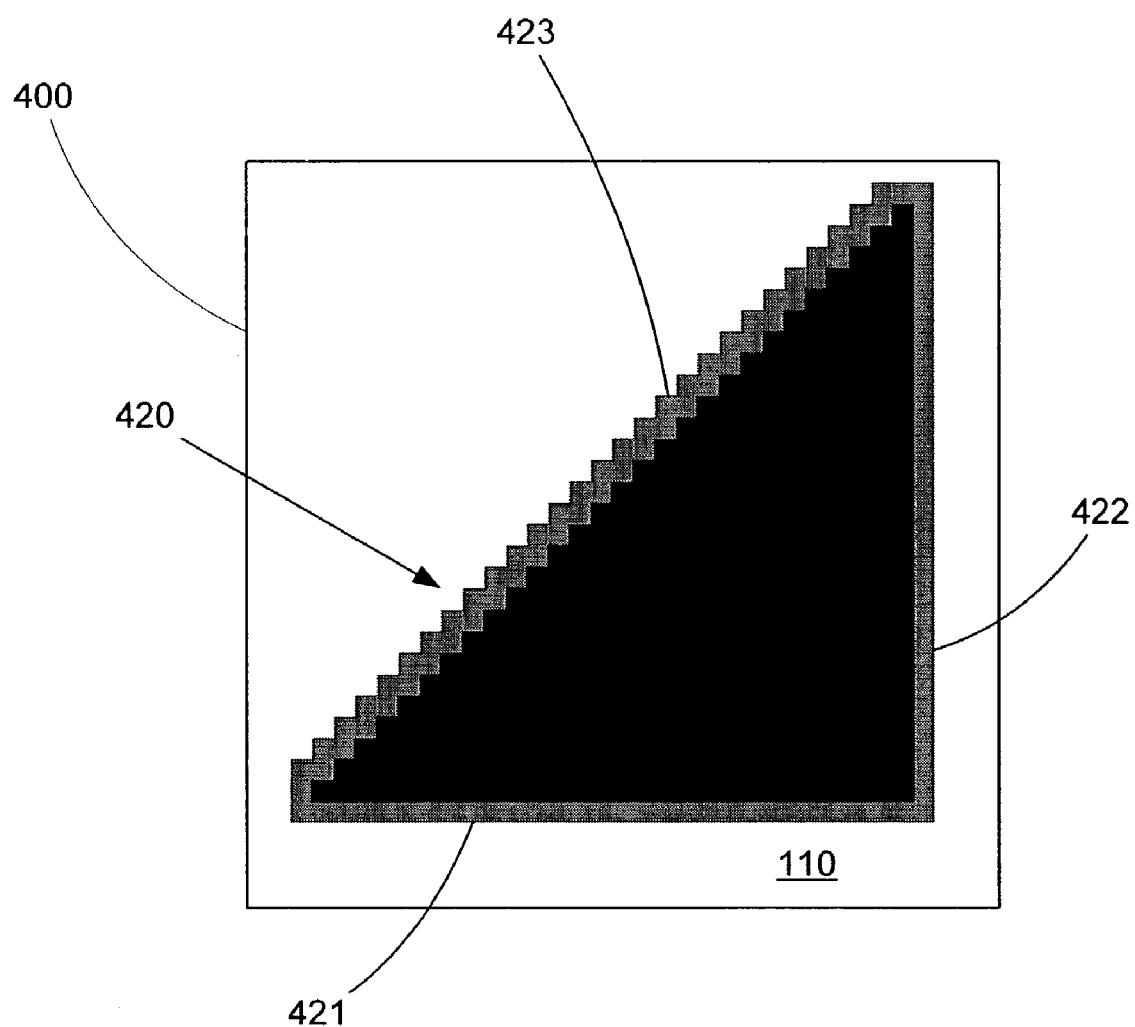
Figure 5:
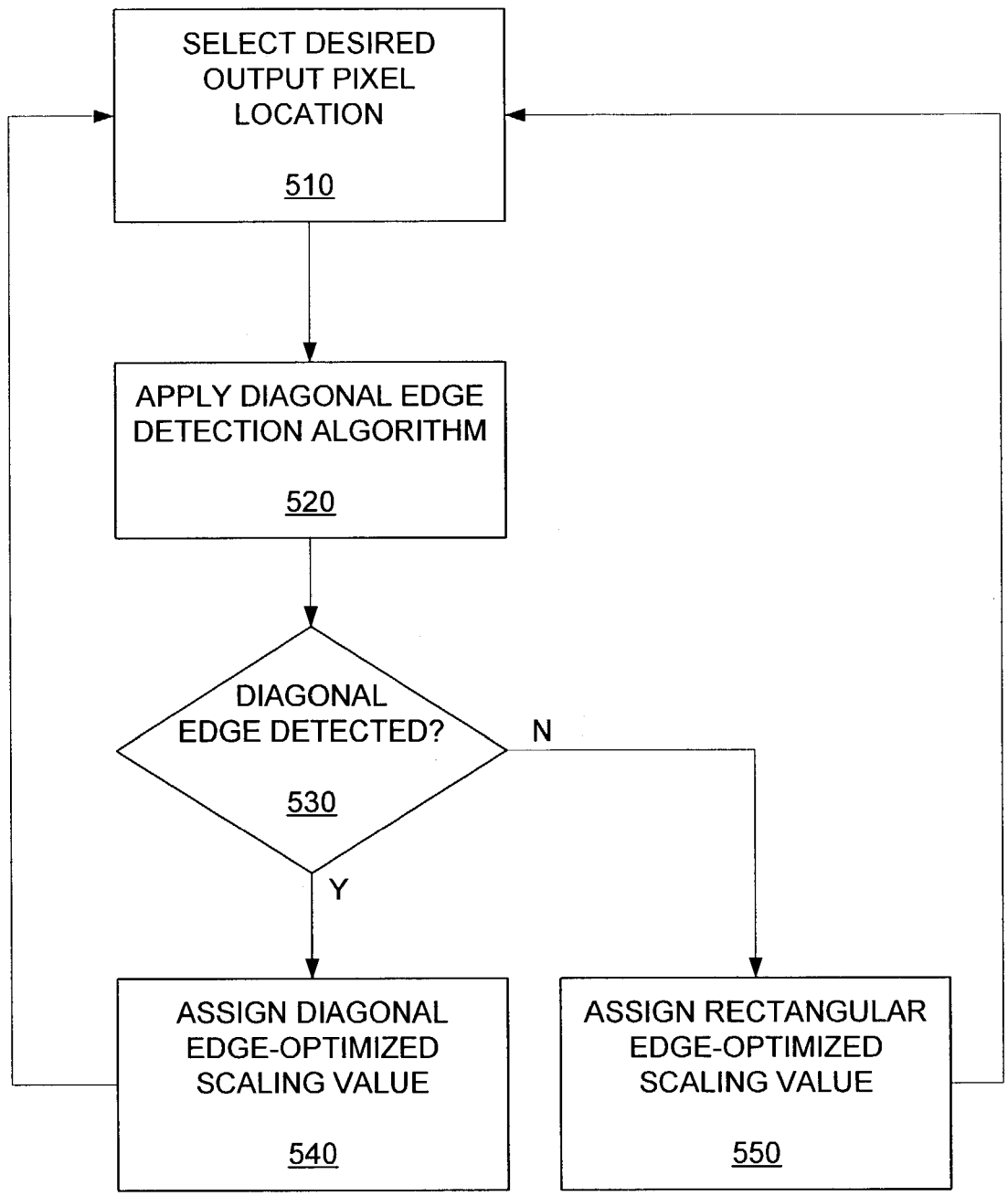
FIG. 5 is a flow diagram for an upscaling process incorporating edge detection in accordance with an embodiment of the invention.

The invention improves the visual quality of upscaled images by identifying diagonal edges in the original image and applying an optimized scaling algorithm to those edges. FIG. 5 is a flow diagram for a digital image upscaling process in accordance with an embodiment of the invention. A desired location for an output pixel of the upscaled image is first selected in step 510, and a diagonal edge detection algorithm is applied based on that desired location in step 520. Decision block 530 then selects the next step in the process based on the diagonal edge detection results. If the output pixel is determined to be associated with (i.e., in the vicinity of) a diagonal edge in the original image, the pixel data for the output pixel is assigned using a scaling process optimized for diagonal edges in step 540. According to an embodiment of the invention, this diagonal edge-optimized process can comprise a rotated bilinear scaling process, which is described in greater detail below. If the output pixel is determined to not be associated with a diagonal edge, the pixel data for the output pixel is assigned using a scaling process optimized for rectangular edges in step 550. According to an embodiment of the invention, this rectangular edge-optimized scaling process can comprise a rectangular bilinear scaling process, as described previously. After either step 540 or 550, the process loops back to step 510, and a new output pixel location is selected. By applying scaling appropriate to the edge profile associated with an output pixel, improved pixel data can be generated for that output pixel.

Diagonal Edge Detection

Figure 6:
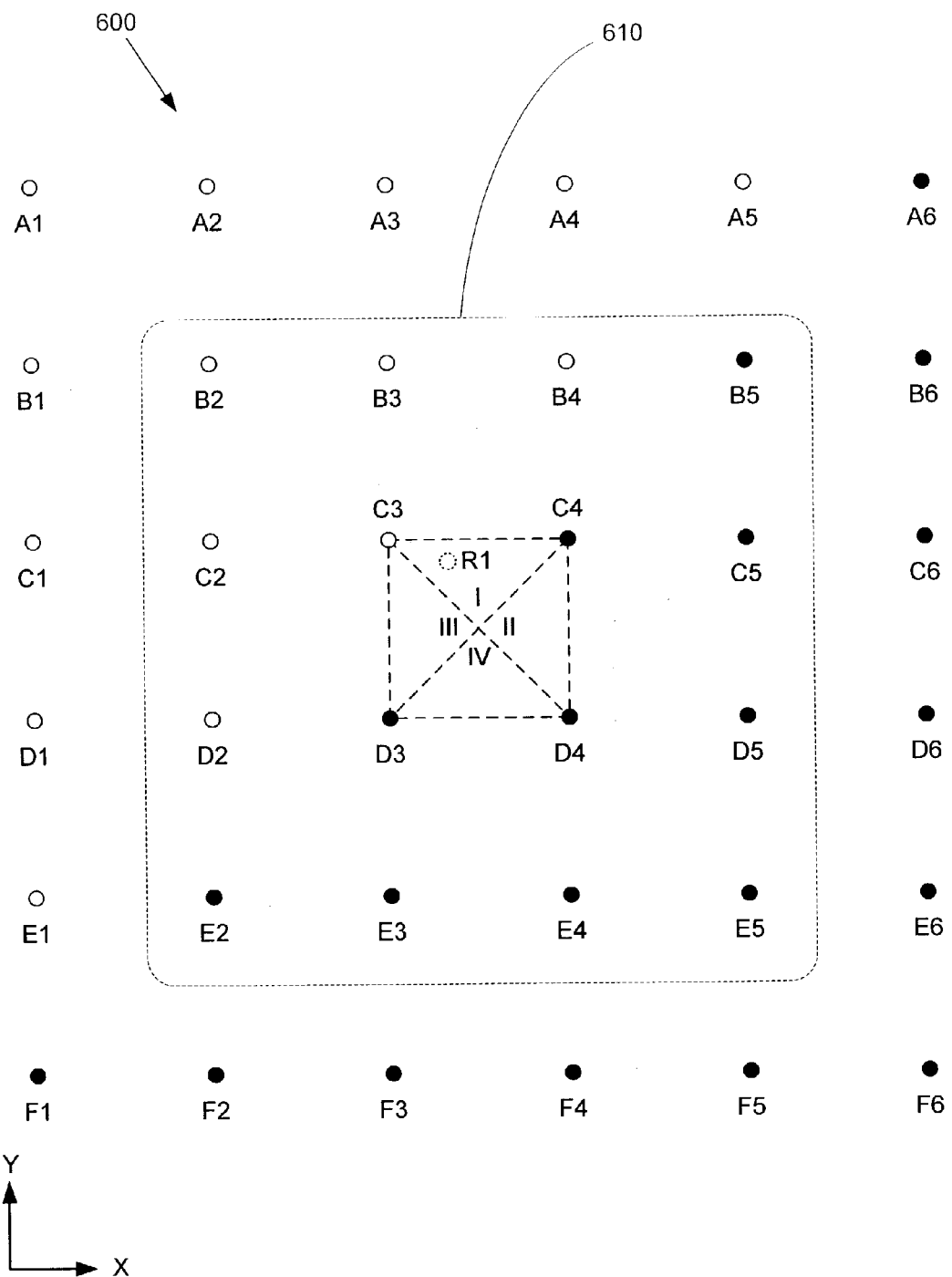
FIG. 6 is a diagram showing the pixels used for edge detection according to an embodiment of the invention.

According to an embodiment of the invention, diagonal edge detection can be performed by applying a weighted matrix to a selected group of pixels surrounding a desired output pixel. For example, FIG. 6 shows a pixel array 600 that includes original pixels A1–A6, B1–B6, C1–C6, D1–D6, E1–E6, and F1–F6. An output pixel R1 is shown in its desired output position. To detect whether or not output pixel R1 is included in a diagonal edge, an enhanced pixel set 610 is selected from among the pixels in pixel array 600. Enhanced pixel set 610 includes a rectangular array of the sixteen pixels closest to and surrounding output pixel R1; i.e., pixels B2–B5, C2–C5, D2–D5, and E2–E5.

Once the enhanced pixel set is determined, the pixel data of those pixels can be multiplied by a weighted matrix with appropriately selected values. Note that pixel data is often in RGB (red-green-blue) form, and RGB data is converted into luminance for the edge detection process. Table 1 shows a sample weighted matrix (matrix 1) that can be used to detect edges having a positive slope. Matrix 1 is a 4×4 rectangular array including sixteen cells 01–16 to which various weighting values have been assigned; i.e., cells 02, 03, 05, and 09 have been assigned values of 1, cell 06 has been assigned a value of 4, cell 11 has been assigned a value of −4, and cells 08, 12, 14, and 15 have been assigned values of −1. Note that cells 01, 04, 07, 10, 13, and 16, are assigned values of zero and therefore do not affect the calculation. Note further that the sum of all weighting values in Matrix 1 is equal to zero, so that the edge detection calculation is unbiased.

TABLE 1

Matrix 1 (Positive Slope Edge Detection)

| 0 01 | 1 02 | 1 03 | 0 04 |
|---|---|---|---|
| 1 05 | 4 06 | 0 07 | -1 08 |
| 1 09 | 0 10 | -4 11 | -1 12 |
| 0 13 | -1 14 | -1 15 | 0 16 |

Multiplying the pixel data of enhanced pixel set 610 by matrix 1 thus comprises multiplying the value in a particular cell of matrix 1 with the pixel data of the corresponding pixel in enhanced pixel set 610. For example, cell 02 of matrix 1 corresponds to pixel B3, cell 03 of matrix 1 corresponds to pixel B4, and so on. The absolute value of the sum of these "weighted products" then defines a positive edge strength value. The equation for this positive edge strength value can therefore be provided by:

$$Pv = |M(02)*V(B3)+M(03)*V(B4)+M(05)*V(C2)+ \\ M(06)*V(C3)+M(08)*V(C5)+M(09)*V(D2)+ \\ M(11)*V(D4)+M(12)*V(D5)+M(14)*V(E3)+ \\ M(15)*V(E4)| \quad (1)$$

where Pv is the positive slope edge strength value, M(n) is the value in cell n of matrix 1, and V(m) is the pixel data associated with a pixel m in enhanced pixel set 610 (note that because cells 01, 04, 07, 10, 13, and 16 are all equal to zero, they have been omitted from the equation for clarity). Assuming luminance values of 200 and 10 for the light and dark pixels, respectively, in pixel array 600, Equation (1) resolves to:

$$Pv = |1*200 + 1*200 + 1*200 + 4*200 + \quad (2) \\ (-1)*10 + 1*200 + (-4)*10 + \\ (-1)*10 + (-1)*10 + (-1)*10| \\ = 1520$$

If the magnitude of the resulting positive edge strength value Pv is greater than a threshold edge strength value, the selected output pixel (R1) is found to be a positive slope diagonal edge pixel, and is processed accordingly. The larger the threshold edge strength value, the more selective the edge detection algorithm becomes. In the present example, a threshold edge strength value of 1000 would be a reasonable choice to ensure proper edge detection. However, various other values could be selected depending on user preference, and according to an embodiment of the invention, the threshold strength value can be programmable based on user inputs. Note that the calculated positive slope edge strength value of 1520 would clearly exceed a threshold edge strength value of 1000, and so output pixel R1 would be identified as requiring positive slope edge processing (which is consistent with the pixel pattern depicted in FIG. 6). Note further that the particular values selected for matrix 1 are merely exemplary, and various other values will be readily apparent. As long as the signed cells (i.e., cells having an assigned, non-zero value) above the line of cells running diagonally upward through the center of the array (i.e., the diagonal line formed by cells 04, 07, 10, and 13) have a first sign while the signed cells below the diagonal line have the opposite sign, matrix 1 can be used to detect positive slope diagonal edges.

Similarly, determining whether or not the selected output pixel is part of a negative slope diagonal edge can also be performed through the use of a weighted matrix. For example, Table 2 shows a sample weighted matrix (matrix 2) that can be used to detect edges having a negative slope. Matrix 2 is a 4×4 rectangular array that includes sixteen cells 01–16 to which various weighting values have been assigned; i.e., cells 02, 03, 08, and 12 have been assigned values of 1, cell 07 has been assigned a value of 4, cell 10 has been assigned a value of −4, and cells 05, 09, 14, and 15 have been assigned values of −1. Note that cells 01, 04, 06, 11, 13, and 16, are assigned values of zero and therefore do not affect the calculation.

TABLE 2

Matrix 2 (Negative Slope Edge Detection)

| 0 1 | 1 2 | 1 3 | 0 4 |
|---|---|---|---|
| -1 5 | 0 6 | 4 7 | 1 8 |
| -1 9 | -4 10 | 0 11 | 1 12 |
| 0 13 | -1 14 | -1 15 | 0 16 |

Multiplying the pixel data of enhanced pixel set 610 by matrix 2 and taking the absolute value of the result thus produces an equation as follows:

$$Nv = |M(02)*V(B3)+M(03)*V(B4)+M(05)*V(C2)+ \\ M(07)*V(C4)+M(08)*V(C5)+M(09)*V(D2)+ \\ M(10)*V(D3)+M(12)*V(D5)+M(14)*V(E3)+ \\ M(15)*V(E4)| \quad (3)$$

where Nv is the negative slope edge strength value, M(n) is the value in cell n of matrix 1, and V(m) is the pixel data associated with pixel m in enhanced pixel set 610 (note that because cells 01, 04, 06, 11, 13, and 16 are all equal to zero, they have been omitted from the equation for clarity). Assuming luminance values of 200 and 10 for the light and dark pixels, respectively, in pixel array 600, Equation (3) resolves to:

$$Nv = |1*10 + 1*10 + (-1)*10 + 4*200 + \quad (4) \\ 1*200 + (-1)*10 + (-4)*200 + \\ 1*200 + (-1)*200 + (-1)*200| \\ = 0$$

If the magnitude of the resulting negative slope edge strength value is greater than the threshold edge strength value, the selected output pixel (R1) is found to be a negative slope diagonal edge pixel, and is processed accordingly. In the present example, comparing the calculated negative edge strength value of 0 to the previously selected threshold edge strength value of 1000, it is clear that output pixel R1 is not part of a negative slope edge and so would not require negative slope diagonal edge processing (which is consistent with the pixel pattern depicted in FIG. 6). Note that the particular values selected for matrix 2 are merely exemplary, and various other values will be readily apparent. As long as the signed cells above the line of cells running diagonally downward through the center of the array (i.e., the row formed by cells 01, 06, 11, and 16) have a first sign while the signed cells below the diagonal line have the opposite sign, matrix 2 can be used to detect negative slope diagonal edges.

Rotated Bilinear Scaling

Figure 7:
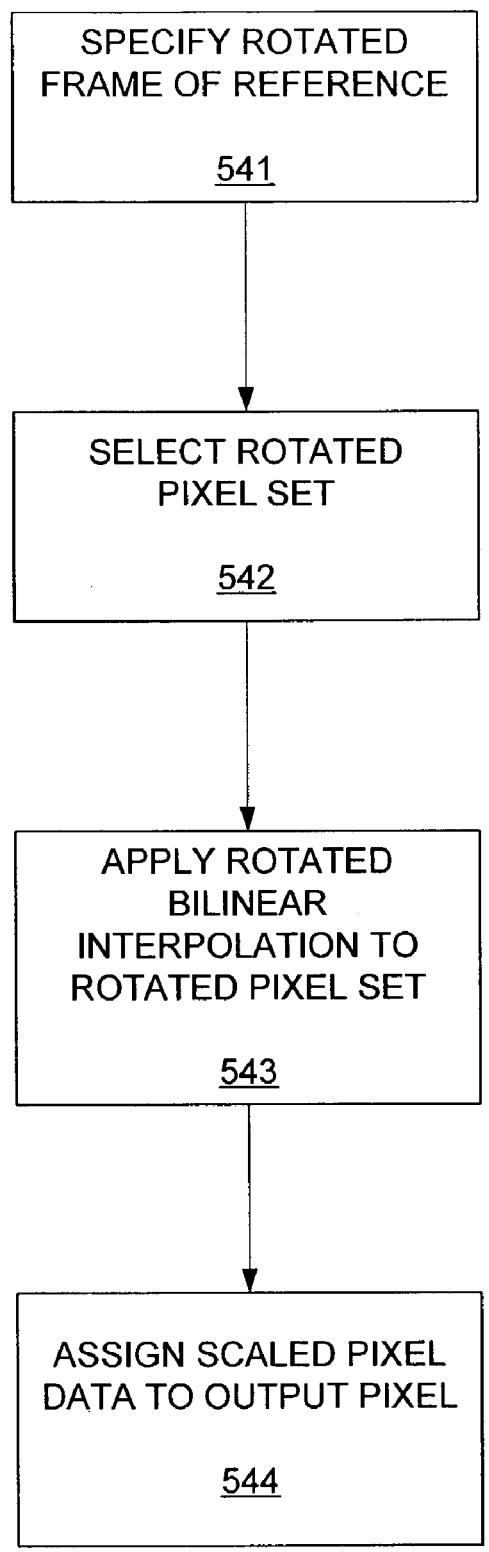
FIG. 7 is a flow diagram for a rotated bilinear scaling process in accordance with an embodiment of the invention.

For output pixels associated with a diagonal edge, a scaling algorithm optimized for diagonal edges is used to determine the scaled pixel data for the output pixel. According to an embodiment of the invention, a rotated bilinear scaling process can be used to determine the scaled pixel data. FIG. 7 shows a flow diagram for a rotated bilinear scaling process that could be used in step 540 of FIG. 5. In step 541, a rotated frame of reference is specified, based on whether the diagonal edge has a positive slope or a negative slope, and also the location of the output pixel. The rotated frame of reference is defined by axes that are oriented at 45° angles with respect to the horizontal and vertical axes (X and Y axes, as shown in FIG. 6) of the original pixel array. Then, in step 542, the four pixels most closely surrounding the output pixel as a parallelogram and having two sides parallel to one of the axes of the rotated frame of reference are selected as a rotated pixel set. In contrast to the conventional square pixel set used by the rectangular bilinear scaling process, the four pixels making up the rotated pixel set form a parallelogram having two sides that are parallel to one of the axes in the rotated frame of reference. A modified bilinear interpolation operation is then applied to these four pixels in step 543 to calculate the scaled pixel data, which is then assigned to the output pixel in step 544. The modified bilinear interpolation operation is substantially the same as the rectangular bilinear interpolation operation described with respect to equation (a), except that it includes compensation for the offset introduced by the parallelogram-shaped rotated pixel set. By performing this modified bilinear interpolation within the rotated frame of reference (i.e., defining distances with respect to the rotated axes), the rotated bilinear scaling process generates significantly improved results for upscaled diagonal edges as compared with rectangular bilinear scaling of diagonal edges.

As noted previously, the specifics of the rotated bilinear interpolation process depend on the slope of the associated diagonal line and the specific position of the output pixel. The slope of the diagonal line (positive or negative) is determined as previously described in with respect to the diagonal edge detection process. The position of the output pixel is determined with respect to the closest four surrounding original pixels. For example, returning to FIG. 6, the original pixels nearest to output pixel R1 are pixels C3, C4, D3, and D4. Those pixels form a square pattern that can be divided into four triangular sectors I, II, III, and IV, as indicated by the dashed lines. Each triangular sector can therefore be defined by two adjacent pixels and the midpoint of pixels C3, C4, D3, and D4. Output pixel R1 might fall within in any of those sectors. This output pixel location, in conjunction with the slope of the edge associated with the output pixel, controls the application of the rotated bilinear scaling operation. Since there are four triangular sectors and two different slopes (positive and negative), there are eight possible position-slope combinations, each of which will be described in detail.

Positive Slope, Output Pixel in Sector I

Figure 8A:
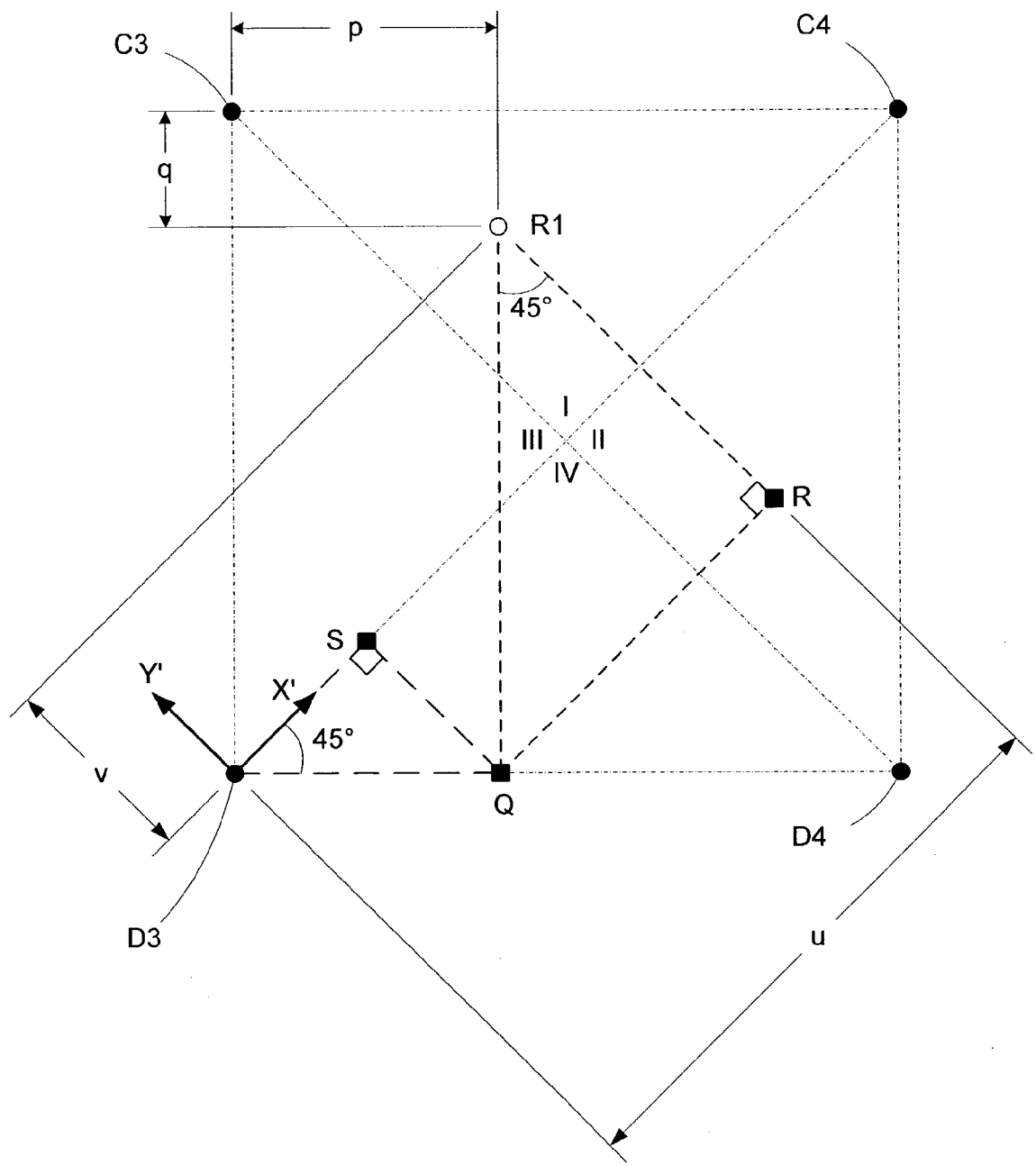
FIGS. 8a–8b, 9a–9b, 10a–10b, 11a–11b, 12a–12b, 13a–13b, 14a–14b, and 15a–15b are diagrams depicting frame of reference adjustments and rotated pixel set selections for rotated bilinear scaling operations in accordance with various embodiments of the invention.

FIG. 8a presents a partial view of enhanced pixel set 610 from FIG. 6, showing output pixel R1 surrounded by four original pixels C3, C4, D3, and D4. Note that the original pixels will hereinafter be depicted as black for clarity since it is assumed that the pixel data for those pixels is known. FIG. 8a illustrates a method for specifying a rotated frame of reference for output pixel R1 associated with a positive slope diagonal edge and located in triangular sector I (i.e., the triangle defined by pixels C3, C4, and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined using a set of rotated axes X' and Y', which are both angled at 45° relative to the original horizontal and vertical (X and Y) axes, respectively of the original pixel array. Because the sign of the edge slope is positive, the new horizontal rotated axis (i.e., axis X') is given a positive 45° slope and is therefore aligned with the line formed by original pixels D3 and C4. Since rotated axis Y' orthogonal to rotated axis X', axis Y' is parallel to the line formed by original pixels C3 and D4. The origin of the rotated axes is selected to be at original pixel D3.

Once the new axes have been defined, the position of output pixel R1 can be specified with respect to these new axes by determining offsets u along the X' axis and v along the Y' axis, both offsets being taken from the location of original pixel D3. To calculate these offsets, reference points Q, R, and S can be defined. Reference point Q represents the point at which a vertical line originating from output pixel R1 intersects the line defined by original pixels D3 and D4. Reference point R represents the point at which a line parallel to axis X' and originating from point Q intersects a line parallel to axis Y' and originating from output pixel R1. Finally, reference point S represents the point at which a line parallel to axis Y' and originating from reference point Q intersects the line defined by original pixels D3 and C4.

Using the aforementioned reference points Q, R, and S, it can be seen that offset u can be calculated by adding the lengths of the line defined by pixel D3 and reference point S (hereinafter referred to as line D3-S), and the line defined by reference points Q and R (hereinafter referred to as line Q-R). From the geometry depicted in FIG. 8a, the length of line D3-S can be determined by using the following formula:

$$L(D3-S) = p*\cos(45°) \quad (5)$$
$$= \frac{\sqrt{2}}{2}*p$$

where L(D3-S) represents the length of line D3-S. Then, the length of line Q-R can be determined by the following formula:

$$L(Q-R) = (1-q)*\sin(45°) \quad (6)$$
$$= \frac{\sqrt{2}}{2}*(1-q)$$

where L(Q-R) represents the length of line Q-R, and the vertical distance between original pixels C3 and D3 is defined to be 1 (i.e., a normalized distance). Finally, by adding the results of equations (5) and (6), offset u can be determined as:

$$u = L(D3 - S) + L(Q - R) \quad (7)$$
$$= \frac{\sqrt{2}}{2} * p + \frac{\sqrt{2}}{2} * (1 - q)$$
$$= \frac{\sqrt{2}}{2} * (p + 1 - q)$$

In a similar manner, it can be seen that offset v can be calculated by subtracting the length of the line defined by reference points Q and S (hereinafter line Q-S) from the length of the line defined by output pixel R1 and reference point R (hereinafter line R1-R). From the geometry depicted in FIG. 8a, the length of line R1-R can be determined by using the following formula:

$$L(R1 - R) = (1 - q) * \cos(45°) \quad (8)$$
$$= \frac{\sqrt{2}}{2} * (1 - q)$$

where L(R1-R) represents the length of line R1-R. Then, the length of line Q-S can be determined by the following formula:

$$L(Q - S) = p * \sin(45°) \quad (9)$$
$$= \frac{\sqrt{2}}{2} * p$$

where L(Q-S) represents the length of line Q-S. Finally, by subtracting equation (9) from equation (8), offset v can be determined as:

$$v = L(R1 - R) - L(Q - S) \quad (10)$$
$$= \frac{\sqrt{2}}{2} * (1 - q) - \frac{\sqrt{2}}{2} * p$$
$$= \frac{\sqrt{2}}{2} * (1 - p - q)$$

To complete the characterization of output pixel R1 in this new frame of reference, offsets u and v need to be normalized. Offset u can be normalized as follows:

$$u' = u / L(D3 - C4) \quad (11)$$
$$= \frac{\sqrt{2}}{2} * (p + 1 - q) / \sqrt{2}$$
$$= \frac{1}{2} * (p + 1 - q)$$

where u' is the normalized value of offset u, and L(D3–C4) is the length of the line defined by pixels D3 and C4. Offset v can be normalized as follows:

$$v' = u / (L(C3 - D4) / 2) \quad (12)$$
$$= \frac{\sqrt{2}}{2} * (1 - p - q) / \frac{\sqrt{2}}{2}$$
$$= 1 - p - q$$

where v' is the normalized value of offset v, and L(C3–D4) is the length of the line defined by pixels C3 and D4. Note that because offset v is measured from axis X', which intersects the midpoint of pixels C3, C4, D3, and D4, offset v is normalized by half of the distance between pixels C3 and D4.

Figure 8B:
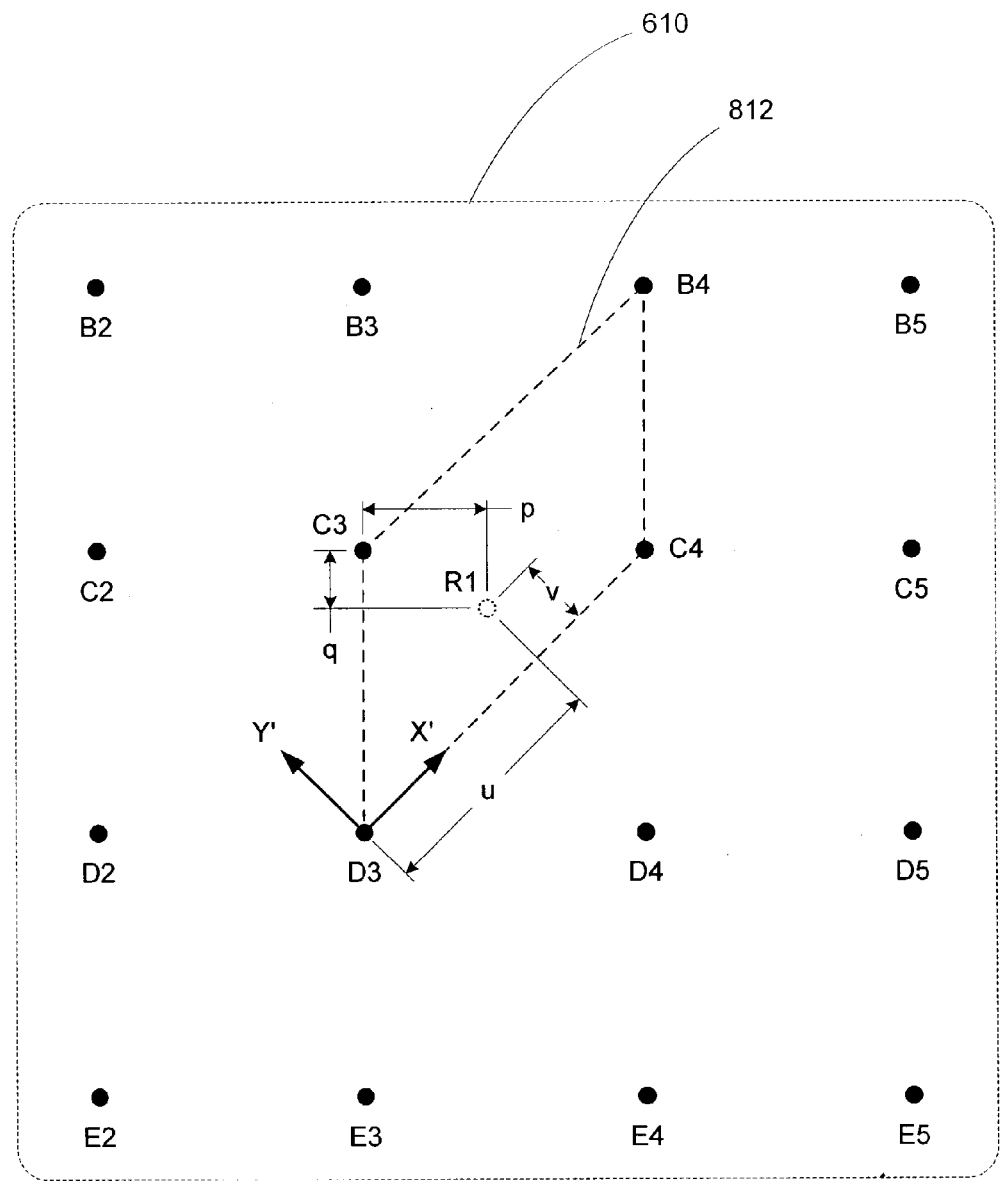

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 8b shows a detail view of enhanced pixel set 610 from FIG. 6, incorporating the rotated frame of reference and normalized offsets calculated with respect to FIG. 8a, and including a rotated pixel set 812 that includes original pixels B4, C3, C4, and D3. As indicated in FIG. 8b, rotated pixel set 812 includes the four original pixels (B4, C3, C4, and D3) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(I, pos) = [V(C4) * u' + V(D3) * (1 - u')] * (1 - v') + \quad (13)$$
$$\left[V(B4) * \left(u' - \frac{1}{2}\right) + V(C3) * \left(1 - \left(u' - \frac{1}{2}\right)\right)\right] * v'$$

where V(I, pos) is the scaled pixel data for an output pixel located in sector I and associated with a positive slope edge, u' and v' are the normalized rotated offsets calculated in equations (11) and (12), respectively, and V(B4), V(C3), V(C4), and V(D3) are the pixel data of original pixels B4, C3, C4, and D3, respectively. Note that this is the standard bilinear interpolation function (as described with respect to equation (a)) applied to pixels B4, C3, C4, and D3, except that a correction factor of one-half is subtracted from the u' offset for the portions of the expression involving pixels B4 and C3. This correction factor is applied to compensate for the fact that rotated pixel set 812 forms a parallelogram, and pixels B4 and C3 are therefore offset from the Y' axis by an additional distance of one-half (normalized) in the X' axis direction.

Positive Slope, Output Pixel in Sector II

Figure 9A:
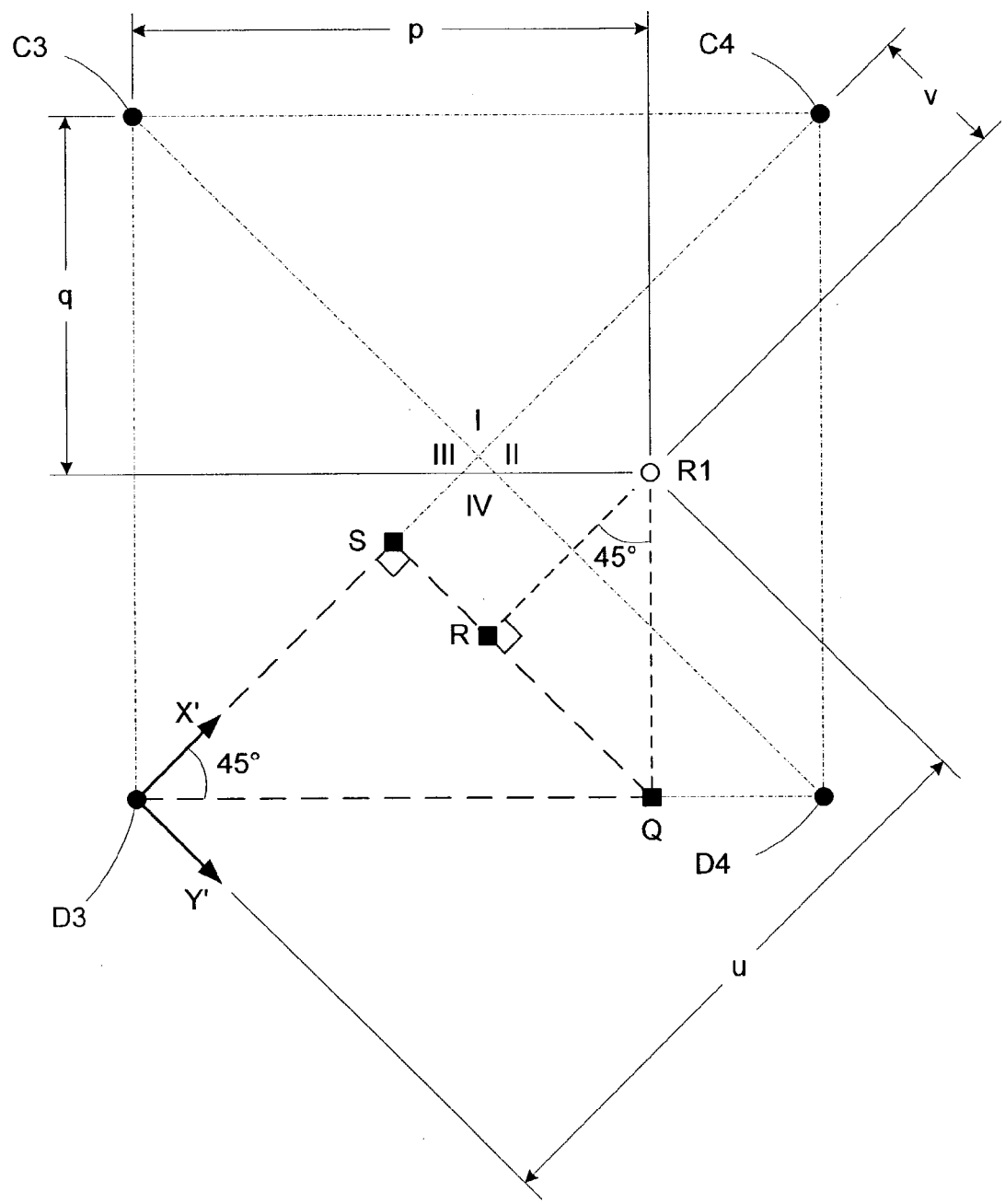

FIG. 9a presents a partial view of enhanced pixel set 610 from FIG. 6, showing output pixel R1 surrounded by four original pixels C3, C4, D3, and D4. FIG. 9a illustrates a method for specifying a rotated frame of reference for output pixel R1 associated with a positive slope diagonal edge and located in triangular sector II (i.e., the triangle defined by pixels C4, D4, and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined, with original pixel D3 now selected as the origin and new axes X' and Y' angled at 45° to the original horizontal and vertical axes of the pixel array. Note that axis X' is parallel to the line formed by original pixels D3 and C4, while axis Y' is parallel to the line formed by original pixels D4 and C3. Note further that since output pixel R1 is below the line formed by original pixels D4 and C3, the directionality of axis Y' is opposite to that of axis Y' shown in FIG. 8a (this directionality convention will apply to all subsequent discussions).

Once the new axes have been defined, the position of output pixel R1 can be specified with respect to these new axes by determining offsets u along the X' axis and v along the Y' axis, both offsets being taken from the location of original pixel D3. To calculate these offsets, reference points Q, R, and S can be defined. Reference point Q represents the point at which a vertical line originating from output pixel R1 intersects the line defined by original pixels D3 and D4. Reference point R represents the point at which a line parallel to axis Y' and originating from point Q intersects a line parallel to axis X' and originating from output pixel R1. Finally, reference point S represents the point at which a line parallel to axis Y' and originating from reference point Q intersects the line defined by original pixels D3 and C4.

Using the aforementioned reference points Q, R, and S, it can be seen that offset u can be calculated by adding the lengths of the line defined by pixel D3 and reference point S (hereinafter referred to as line D3-S), and the line defined by output pixel R1 and reference point R (hereinafter referred to as line R1-R). From the geometry depicted in FIG. 9a, the length of line D3-S can be determined by using the following formula:

$$L(D3-S) = p*\cos(45°) \quad (14)$$
$$= \frac{\sqrt{2}}{2}*p$$

where L(D3-S) represents the length of line D3-S. Then, the length of line R1-R can be determined by the following formula:

$$L(R1-R) = (1-q)*\cos(45°) \quad (15)$$
$$= \frac{\sqrt{2}}{2}*(1-q)$$

where L(R1-R) represents the length of line R1-R, and the vertical distance between original pixels C3 and D3 is defined to be 1 (i.e., a normalized distance). Finally, by adding the results of equations (14) and (15), offset u can be determined as:

$$u = L(D3-S) + L(R1-R) \quad (16)$$
$$= \frac{\sqrt{2}}{2}*p + \frac{\sqrt{2}}{2}*(1-q)$$
$$= \frac{\sqrt{2}}{2}*(p+1-q)$$

In a Similar manner, it can be seen that offset v can be calculated by subtracting the length of the line defined by reference points Q and R (hereinafter line Q-R) from the length of the line defined by reference points Q and S (hereinafter line Q-S). From the geometry depicted in FIG. 9a, the length of line Q-S can be determined by using the following formula:

$$L(Q-S) = p*\sin(45°) \quad (17)$$
$$= \frac{\sqrt{2}}{2}*p$$

where L(Q-S) represents the length of line Q-S. Then, the length of line Q-R can be determined by the following formula:

$$L(Q-R) = (1-q)*\sin(45°) \quad (18)$$
$$= \frac{\sqrt{2}}{2}*(1-q)$$

where L(Q-R) represents the length of line Q-R. Finally, by subtracting equation (18) from equation (17), offset v can be determined as:

$$v = L(Q-S) - L(Q-R) \quad (19)$$
$$= \frac{\sqrt{2}}{2}*p - \frac{\sqrt{2}}{2}*(1-q)$$
$$= \frac{\sqrt{2}}{2}*(p-1+q)$$

To complete the characterization of output pixel R1 in this new frame of reference, offsets u and v need to be normalized. Offset u can be normalized as follows:

$$u' = u/L(D3-C4) \quad (20)$$
$$= \frac{\sqrt{2}}{2}*(p+1-q)/\sqrt{2}$$
$$= \frac{1}{2}*(p+1-q)$$

where u' is the normalized value of offset u, and L(D3–C4) is the length of the line defined by pixels D3 and C4. Offset v can be normalized as follows:

$$v' = u/(L(C3-D4)/2) \quad (21)$$
$$= \frac{\sqrt{2}}{2}*(p-1+q)/\frac{\sqrt{2}}{2}$$
$$= p-1+q$$

where v' is the normalized value of offset v, and L(C3–D4) is the length of the line defined by pixels C3 and D4. Note that because offset v is measured from axis X', which intersects the midpoint of pixels C3, C4, D3, and D4, offset v is normalized by half of the distance between pixels C3 and D4.

Figure 9B:
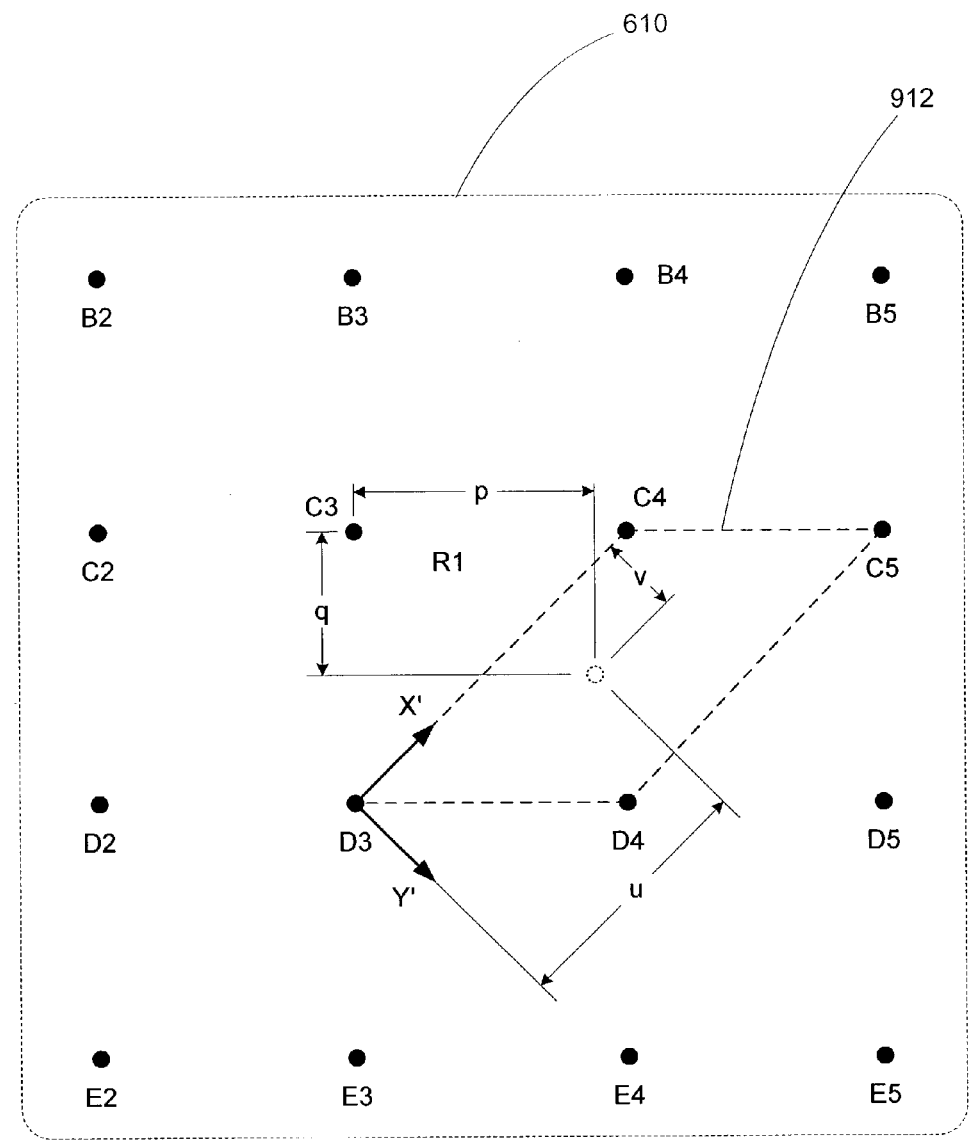

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 9b shows a detail view of enhanced pixel set 610 from FIG. 6, incorporating the rotated frame of reference and normalized offsets calculated with respect to FIG. 9a, and including a rotated pixel set 912 that includes original pixels C4, C5, D3, and D4. As indicated in FIG. 9b, rotated pixel set 912 includes the four original pixels (C4, C5, D3, and D4) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(II, pos) = [V(C4)*u' + V(D3)*(1-u')]*(1-v') + \qquad (22)$$
$$\left[V(C5)*\left(u' - \frac{1}{2}\right) + V(D4)*\left(1 - \left(u' - \frac{1}{2}\right)\right)\right]*v'$$

where V(II, pos) is the scaled pixel data for an output pixel located in sector II and associated with a positive slope edge, u' and v' are the normalized rotated offsets calculated in equations (20) and (21), respectively, and V(C4), V(C5), V(D3), and V(D4) are the pixel data of original pixels C4, C5, D3, and D4, respectively. Note that this is the standard bilinear interpolation function (as described with respect to equation (a)) applied to pixels C4, C5, D3, and D4, except that as in equation (13), a correction factor of one-half is subtracted from the u' offset for the portions of the expression involving pixels C5 and D4. This correction factor is applied to compensate for the fact that rotated pixel set 912 forms a parallelogram, and pixels C5 and D4 are therefore offset from the Y' axis by an additional distance of one-half (normalized) in the X' axis direction.

Positive Slope, Output Pixel in Sector III

Figure 10A:
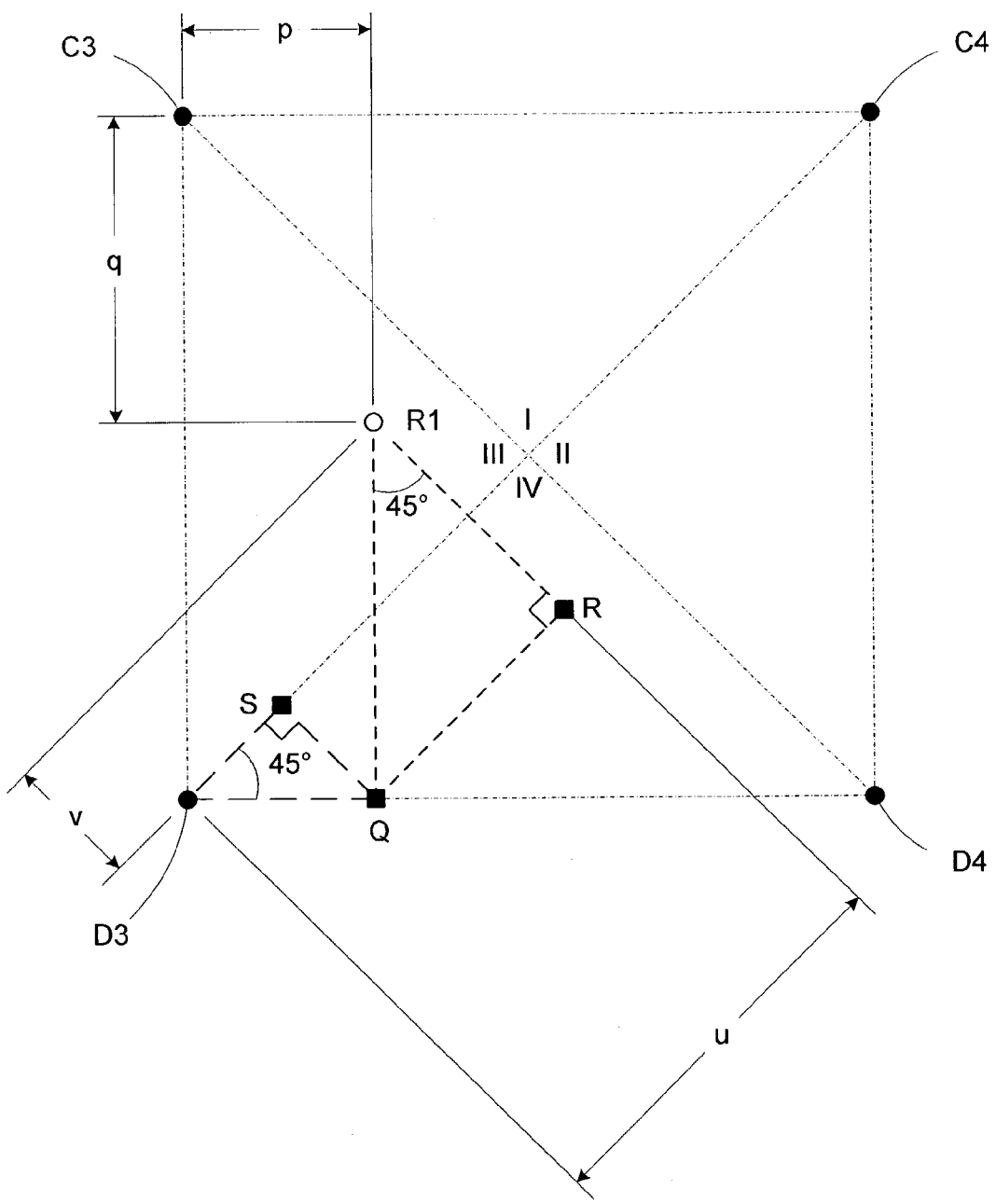

FIG. 10a presents a partial view of enhanced pixel set 610 from FIG. 6, showing output pixel R1 surrounded by four original pixels C3, C4, D3, and D4. FIG. 10a illustrates a method for specifying a rotated frame of reference for output pixel R1 associated with a positive slope diagonal edge and located in triangular sector III (i.e., the triangle defined by pixels C3, D3, and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined, with original pixel D3 now selected as the origin and new axes X' and Y' angled at 45° to the original horizontal and vertical axes of the pixel array. Note that axis X' is parallel to the line formed by original pixels D3 and C4, while axis Y' is parallel to the line formed by original pixels D4 and C3.

Once the new axes have been defined, the position of output pixel R1 can be specified with respect to these new axes by determining offsets u along the X' axis and v along the Y' axis, both offsets being taken from the location of original pixel D3. To calculate these offsets, reference points Q, R, and S can be defined. Reference point Q represents the point at which a vertical line originating from output pixel R1 intersects the line defined by original pixels D3 and D4. Reference point R represents the point at which a line parallel to axis X' and originating from point Q intersects a line parallel to axis Y' and originating from output pixel R1. Finally, reference point S represents the point at which a line parallel to axis Y' originating from reference point Q intersects the line defined by original pixels D3 and C4.

Using the aforementioned reference points Q, R, and S, it can be seen that offset u can be calculated by adding the lengths of the line defined by pixel D3 and reference point S (hereinafter referred to as line D3-S), and the line defined by reference points Q and R (hereinafter referred to as line Q-R). From the geometry depicted in FIG. 10a, the length of line D3-S can be determined by using the following formula:

$$L(D3 - S) = p * \cos(45°) \qquad (23)$$
$$= \frac{\sqrt{2}}{2} * p$$

where L(D3-S) represents the length of line D3-S. Then, the length of line Q-R can be determined by the following formula:

$$L(Q - R) = (1 - q) * \sin(45°) \qquad (24)$$
$$= \frac{\sqrt{2}}{2} * (1 - q)$$

where L(Q-R) represents the length of line Q-R, and the vertical distance between original pixels C3 and D3 is defined to be 1 (i.e., a normalized distance). Finally, by adding the results of equations (23) and (24), offset u can be determined as:

$$u = L(D3 - S) + L(Q - R) \qquad (25)$$
$$= \frac{\sqrt{2}}{2} * p + \frac{\sqrt{2}}{2} * (1 - q)$$
$$= \frac{\sqrt{2}}{2} * (p + 1 - q)$$

In a similar manner, it can be seen that offset v can be calculated by subtracting the length of the line defined by reference points Q and S (hereinafter line Q-S) from the length of the line defined by output pixel R1 and reference point R (hereinafter line R1-R). From the geometry depicted in FIG. 10a, the length of line R1-R can be determined by using the following formula:

$$L(R1 - R) = (1 - q) * \cos(45°) \qquad (26)$$
$$= \frac{\sqrt{2}}{2} * (1 - q)$$

where L(R1-R) represents the length of line R1-R. Then, the length of line Q-S can be determined by the following formula:

$$L(Q-S) = p * \sin(45°) \quad (27)$$
$$= \frac{\sqrt{2}}{2} * p$$

where L(Q-S) represents the length of line Q-S. Finally, by subtracting equation (27) from equation (26), offset v can be determined as:

$$v = L(R1-R) - L(Q-S) \quad (28)$$
$$= \frac{\sqrt{2}}{2} * (1-q) - \frac{\sqrt{2}}{2} * p$$
$$= \frac{\sqrt{2}}{2} * (1-p-q)$$

To complete the characterization of output pixel R1 in this new frame of reference, offsets u and v need to be normalized. Offset u can be normalized as follows:

$$u' = u/L(D3-C4) \quad (29)$$
$$= \frac{\sqrt{2}}{2} * (p+1-q)/\sqrt{2}$$
$$= \frac{1}{2} * (p+1-q)$$

where u' is the normalized value of offset u, and L(D3−C4) is the length of the line defined by pixels D3 and C4. Offset v can be normalized as follows:

$$v' = u/(L(C3-D4)/2) \quad (30)$$
$$= \frac{\sqrt{2}}{2} * (1-p-q) / \frac{\sqrt{2}}{2}$$
$$= 1-p-q$$

where v' is the normalized value of offset v, and L(C3−D4) is the length of the line defined by pixels C3 and D4. Note that because offset v is measured from axis X', which intersects the midpoint of pixels C3, C4, D3, and D4, offset v is normalized by half of the distance between pixels C3 and D4.

Figure 10B:
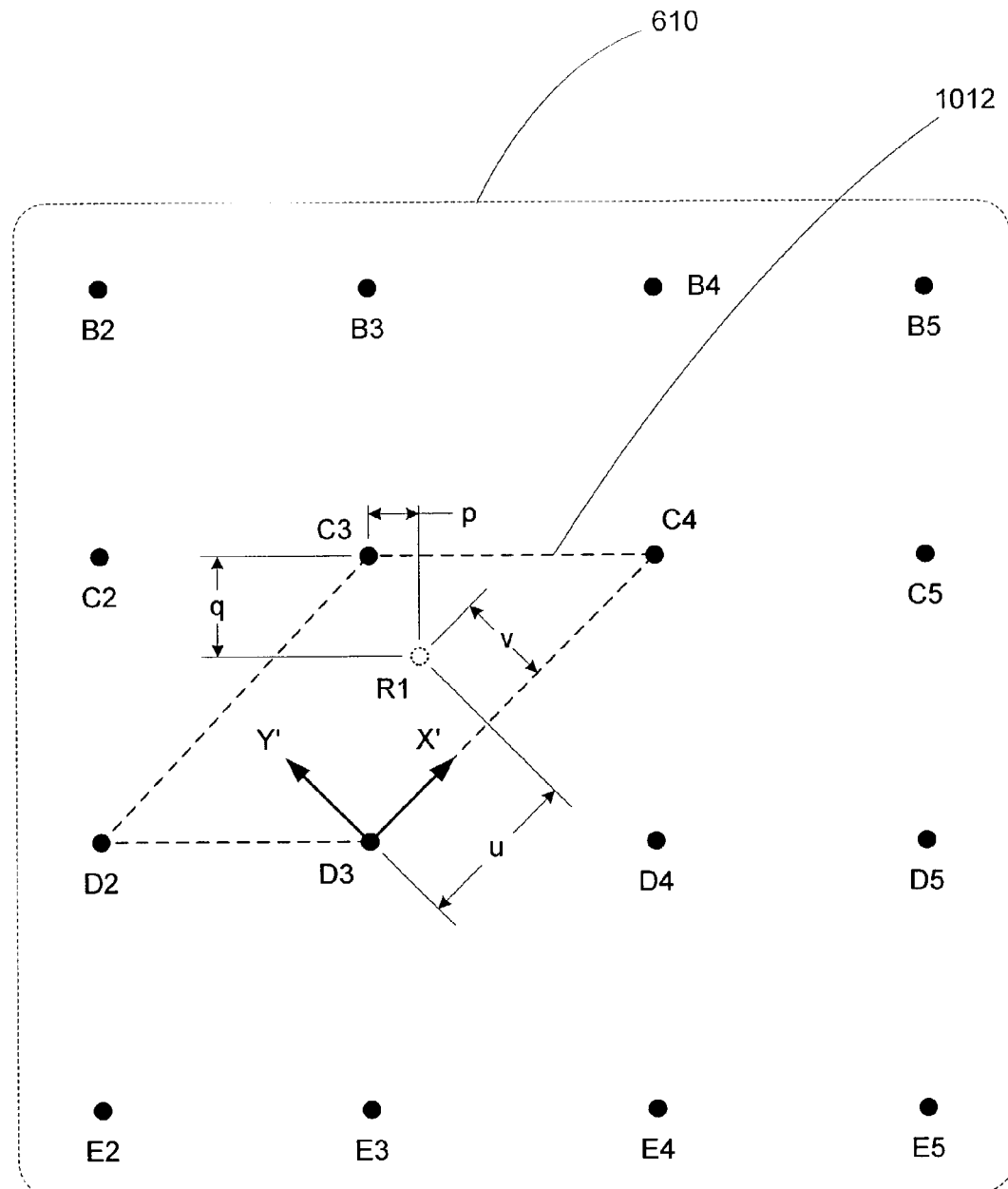

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 10b shows a detail view of enhanced pixel set 610 from FIG. 6, incorporating the rotated frame of reference and normalized offsets calculated with respect to FIG. 10a, and including a rotated pixel set 1012 that includes original pixels C3, C4, D2, and D3. As indicated in FIG. 10b, rotated pixel set 1012 includes the four original pixels (C3, C4, D2, and D3) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(III, pos) = [V(C4)*u' + V(D3)*(1-u')]*(1-v') + \quad (31)$$
$$\left[V(C3)*\left(u'+\frac{1}{2}\right) + V(D2)*\left(1-\left(u'+\frac{1}{2}\right)\right)\right]*v'$$

where V(III, pos) is the scaled pixel data for an output pixel located in sector II and associated with a positive slope edge, u' and V' are the normalized rotated offsets calculated in equations (29) and (30), respectively, and V(C3), V(C4), V(D2), and V(D3) are the pixel data of original pixels C3, C4, D2, and D3, respectively. Note that this is the standard bilinear interpolation function (as described with respect to equation (a)) applied to pixels C3, C4, D2, and D3, except that a correction factor of one-half is added to the u' offset for the portions of the expression involving pixels C3 and D2. This correction factor is applied to compensate for the fact that rotated pixel set 1012 forms a parallelogram, and pixels C3 and D2 are therefore offset from the Y' axis by an additional distance of one-half (normalized) in the X' axis direction (note that this additional offset is actually in the negative X' axis direction—hence the correction factor is added to the u' offset instead of being subtracted as in equations (13) and (22)).

Positive Slope, Output Pixel in Sector IV

Figure 11A:
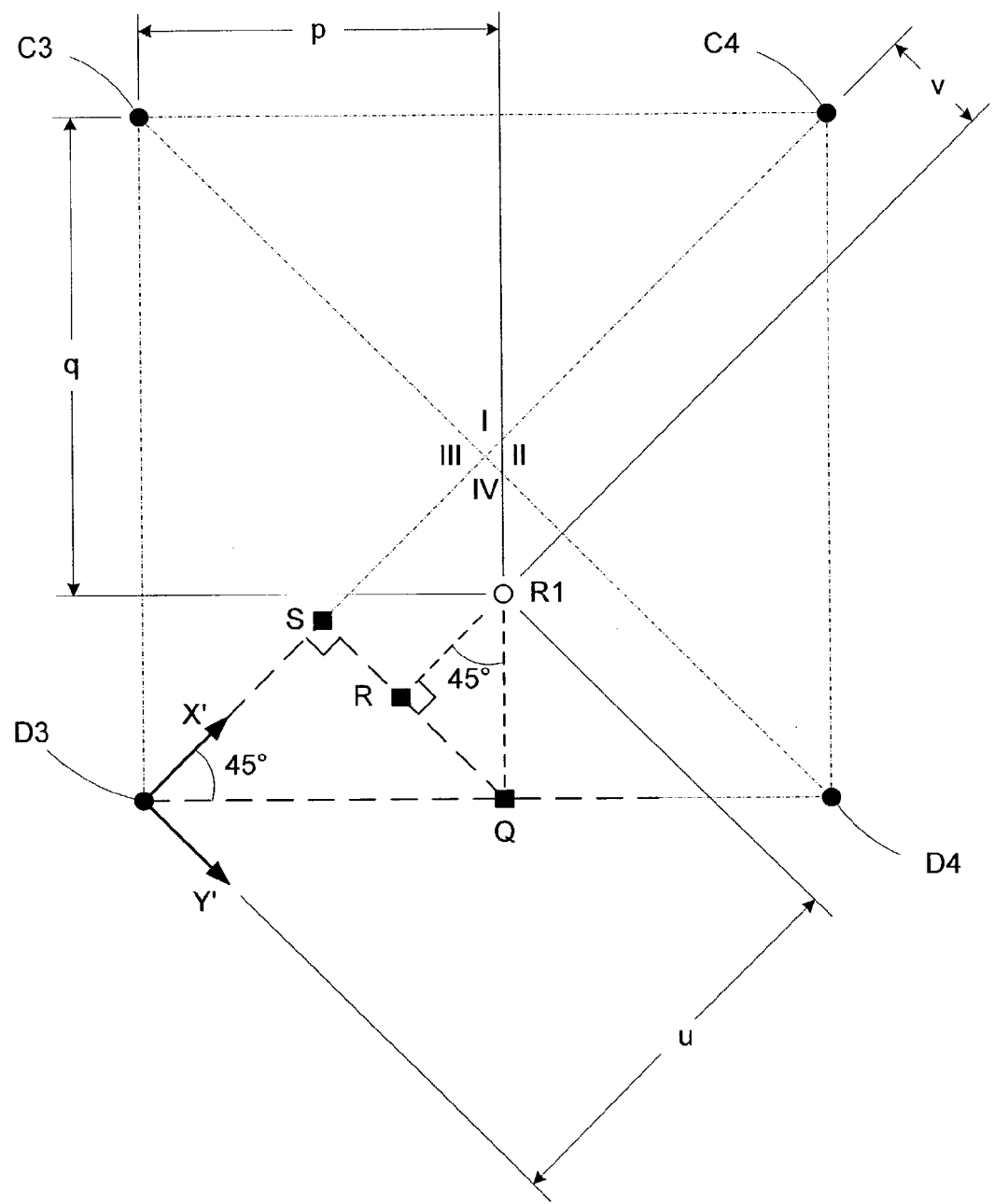

FIG. 11a presents a partial view of enhanced pixel set 610 from FIG. 6, showing output pixel R1 surrounded by four original pixels C3, C4, D3, and D4. FIG. 11a illustrates a method for specifying a rotated frame of reference for output pixel R1 associated with a positive slope diagonal edge and located in triangular sector IV (i.e., the triangle defined by pixels D3, D4, and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined, with original pixel D3 now selected as the origin and new axes X' and Y' angled at 45° to the original horizontal and vertical axes of the pixel array. Note that axis X' is parallel to the line formed by original pixels D3 and C4, while axis Y' is parallel to the line formed by original pixels D4 and C3.

Once the new axes have been defined, the position of output pixel R1 can be specified with respect to these new axes by determining offsets u along the X' axis and v along the Y' axis, both offsets being taken from the location of original pixel D3. To calculate these offsets, reference points Q, R, and S can be defined. Reference point Q represents the point at which a vertical line originating from output pixel R1 intersects the line defined by original pixels D3 and D4. Reference point R represents the point at which a line parallel to axis Y' and originating from point Q intersects a line parallel to axis X' and originating from output pixel R1. Finally, reference point S represents the point at which a line parallel to axis Y' and originating from reference point Q intersects the line defined by original pixels D3 and C4.

Using the aforementioned reference points Q, R, and S, it can be seen that offset u can be calculated by adding the lengths of the line defined by pixel D3 and reference point S (hereinafter referred to as line D3-S), and the line defined by output pixel R1 and reference point R (hereinafter referred to as line R1-R). From the geometry depicted in FIG. 11a, the length of line D3-S can be determined by using the following formula:

$$L(D3-S) = p * \cos(45°) \quad (32)$$
$$= \frac{\sqrt{2}}{2} * p$$

where L(D3-S) represents the length of line D3-S. Then, the length of line R1-R can be determined by the following formula:

$$L(R1-R) = (1-q) * \cos(45°) \quad (33)$$
$$= \frac{\sqrt{2}}{2} * (1-q)$$

where L(R1-R) represents the length of line R1-R, and the vertical distance between original pixels C3 and D3 is defined to be 1 (i.e., a normalized distance). Finally, by adding the results of equations (32) and (33), offset u can be determined $$u = L(D3-S) + L(R1-R) \quad (34)$$
$$= \frac{\sqrt{2}}{2} * p + \frac{\sqrt{2}}{2} * (1-q)$$
$$= \frac{\sqrt{2}}{2} * (p+1-q)$$

In a similar manner, it can be seen that offset v can be calculated by subtracting the length of the line defined by reference points Q and R (hereinafter line Q-R) from the length of the line defined by reference points Q and S (hereinafter line Q-S). From the geometry depicted in FIG. 11a, the length of line Q-S can be determined by using the following formula:

$$L(Q-S) = p * \sin(45°) \quad (35)$$
$$= \frac{\sqrt{2}}{2} * p$$

where L(Q-S) represents the length of line Q-S. Then, the length of line Q-R can be determined by the following formula:

$$L(Q-R) = (1-q) * \sin(45°) \quad (36)$$
$$= \frac{\sqrt{2}}{2} * (1-q)$$

where L(Q-R) represents the length of line Q-R. Finally, by subtracting equation (36) from equation (35), offset v can be determined as:

$$v = L(Q-S) - L(Q-R) \quad (37)$$
$$= \frac{\sqrt{2}}{2} * p - \frac{\sqrt{2}}{2} * (1-q)$$
$$= \frac{\sqrt{2}}{2} * (p-1+q)$$

To complete the characterization of output pixel R1 in this new frame of reference, offsets u and v need to be normalized. Offset u can be normalized as follows:

$$u' = u / L(D3-C4) \quad (38)$$
$$= \frac{\sqrt{2}}{2} * (p+1-q) / \sqrt{2}$$
$$= \frac{1}{2} * (p+1-q)$$

where u' is the normalized value of offset u, and L(D3–C4) is the length of the line defined by pixels D3 and C4. Offset v can be normalized as follows:

$$v' = u / (L(C3-D4)/2) \quad (39)$$
$$= \frac{\sqrt{2}}{2} * (p-1+q) / \frac{\sqrt{2}}{2}$$
$$= p-1+q$$

where v' is the normalized value of offset v, and L(C3–D4) is the length of the line defined by pixels C3 and D4. Note that because offset v is measured from axis X', which intersects the midpoint of pixels C3, C4, D3, and D4, offset v is normalized by half of the distance between pixels C3 and D4.

Figure 11B:
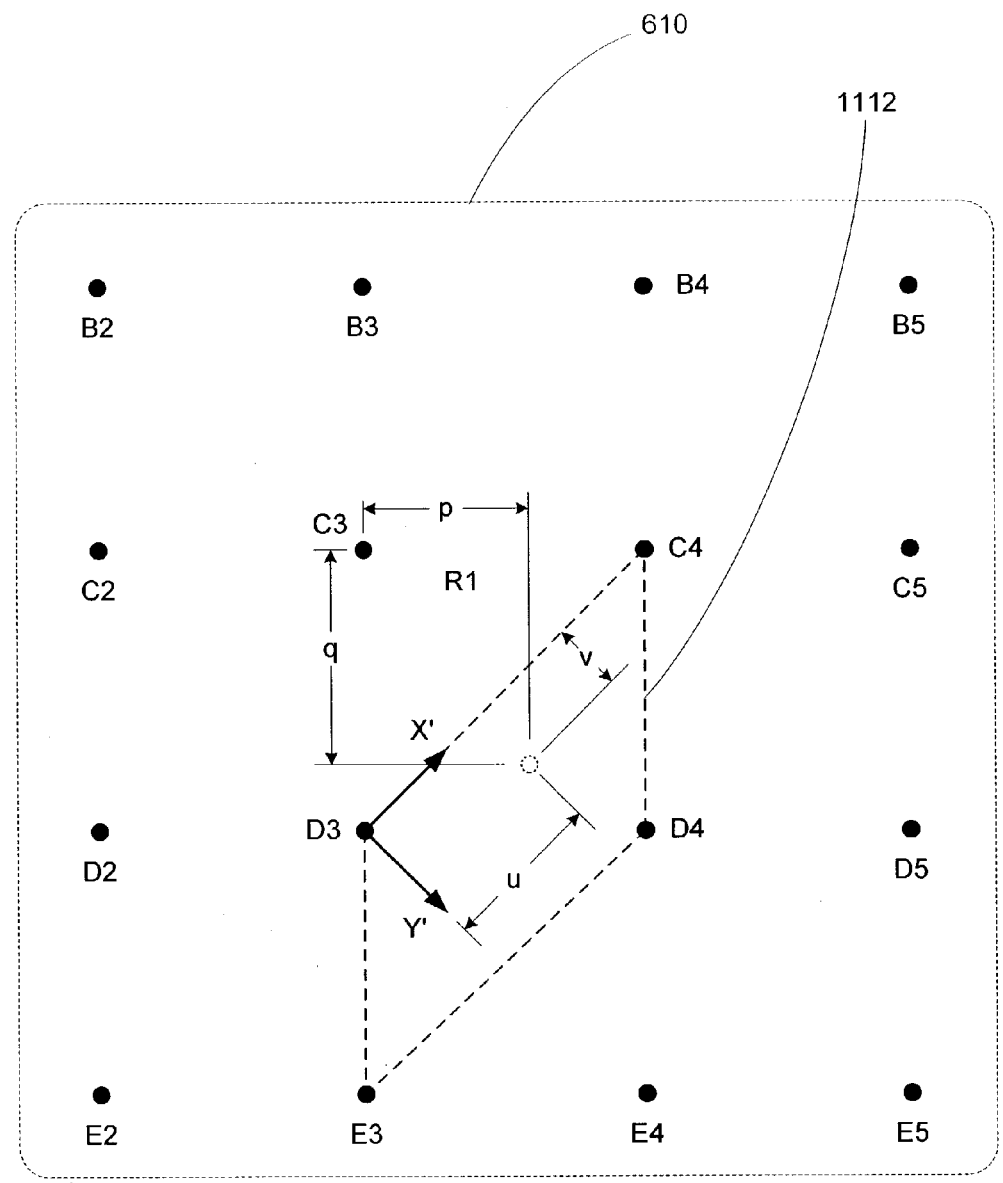

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 11b shows a detail view of enhanced pixel set 610 from FIG. 6, incorporating the rotated frame of reference and normalized offsets calculated with respect to FIG. 11a, and including a rotated pixel set 1112 that includes original pixels C4, D3, D4, and E3. As indicated in FIG. 11b, rotated pixel set 1112 includes the four original pixels (C4, D3, D4, and E3) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(IV, pos) = [V(C4) * u' + V(D3) * (1-u')] * (1-v') + \quad (40)$$
$$\left[ V(D4) * \left(u' + \frac{1}{2}\right) + V(E3) * \left(1 - \left(u' + \frac{1}{2}\right)\right) \right] * v'$$

where V(IV, pos) is the scaled pixel data for an output pixel located in sector IV and associated with a positive slope edge, u' and v' are the normalized rotated offsets calculated in equations (38) and (39), respectively, and V(C4), V(D3), V(D4), and V(E3) are the pixel data of original pixels C4, D3, D4, and E3, respectively. Note that this is the standard bilinear interpolation function (as described with respect to equation (a)) applied to pixels C4, D3, D4, and E3, except that a correction factor of one-half is added to the u' offset for the portions of the expression involving pixels D4 and E3. This correction factor is applied to compensate for the fact that rotated pixel set 1112 forms a parallelogram, and pixels D4 and E3 are therefore offset from the Y' axis by an additional distance of one-half (normalized) in the X' axis direction (as mentioned previously with respect to equation 31, this additional offset is actually in the negative X' axis direction—hence the correction factor is added to the u' offset).

Negative Slope, Output Pixel in Sector I

Figure 12A:
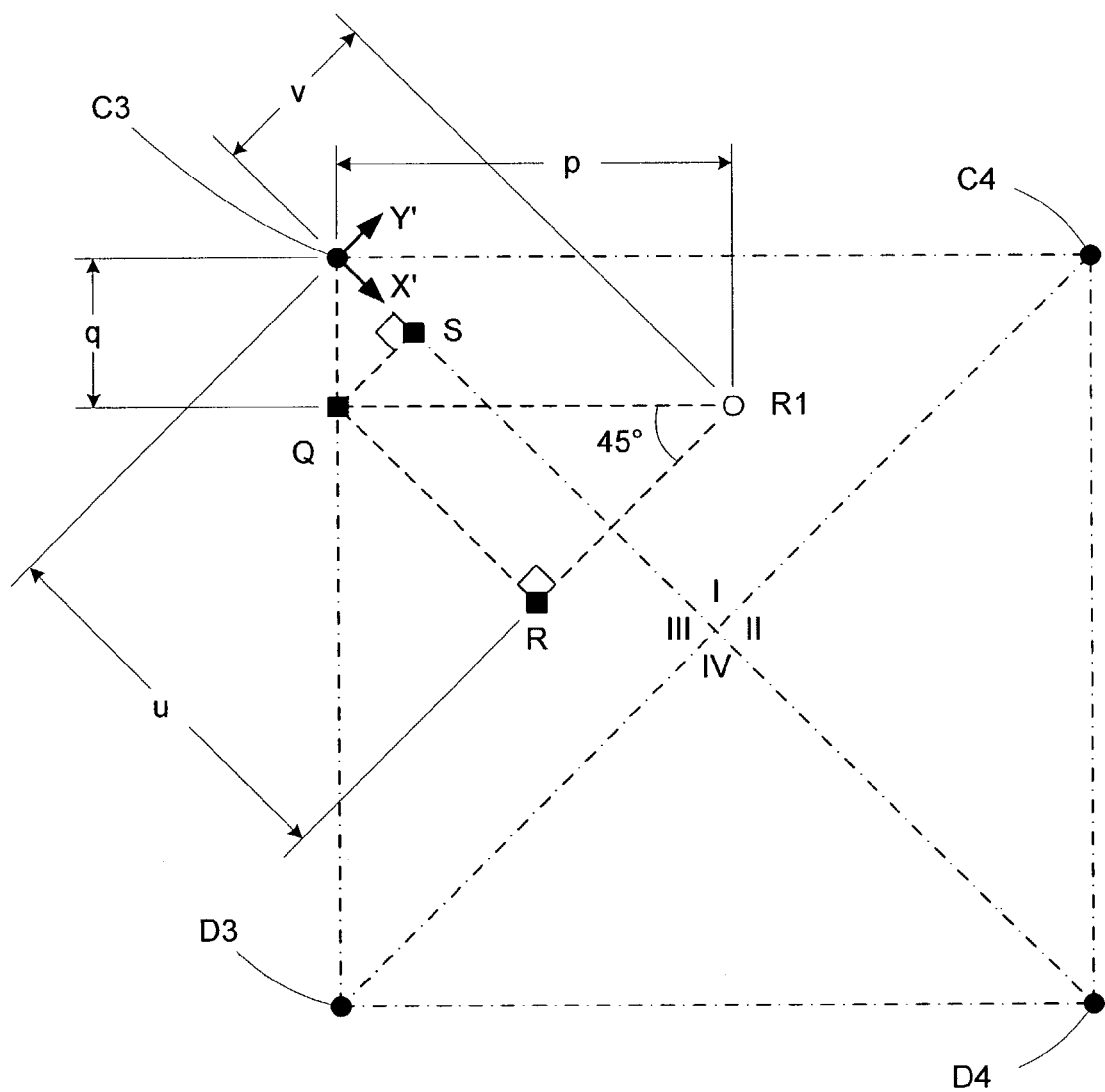

FIG. 12a presents a partial view of enhanced pixel set 610 from FIG. 6, showing output pixel R1 surrounded by four original pixels C3, C4, D3, and D4. FIG. 12a illustrates a method for specifying a rotated frame of reference for output pixel R1 associated with a negative slope diagonal edge and located in triangular sector I (i.e., the triangle defined by pixels C3, C4, and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

As with the rotated bilinear scaling associated with positive slope edges, the rotated frame of reference for negative slope edges is defined using a set of rotated axes X' and Y', which are both angled at 45° relative to the original horizontal and vertical (X and Y) axes, respectively of the original pixel array. However, because the sign of the edge slope is negative, the new horizontal rotated axis (i.e., axis X') is given a negative 45° slope and is therefore aligned with the line formed by original pixels C3 and D4, and the origin of the rotated axes is selected to be at original pixel C3. Now, since rotated axis Y' orthogonal to rotated axis X', axis Y' is parallel to the line formed by original pixels D3 and C4.

Once the new axes have been defined, the position of output pixel R1 can be specified with respect to these new axes by determining offsets u along the X' axis and v along the Y' axis, both offsets being taken from the location of original pixel C3. To calculate these offsets, reference points Q, R, and S can be defined. Reference point Q represents the point at which a horizontal line originating from output pixel R1 intersects the line defined by original pixels C3 and D3. Reference point R represents the point at which a line parallel to axis X' and originating from point Q intersects a line parallel to axis Y' and originating from output pixel R1. Finally, reference point S represents the point at which a line parallel to axis Y' and originating from reference point Q intersects the line defined by original pixels C3 and D4.

Using the aforementioned reference points Q, R, and S, it can be seen that offset u can be calculated by adding the lengths of the line defined by pixel C3 and reference point S (hereinafter referred to as line C3-S), and the line defined by reference points Q and R (hereinafter referred to as line Q-R). From the geometry depicted in FIG. 12a, the length of line C3-S can be determined by using the following formula:

$$L(C3-S) = q*\cos(45°) \quad (41)$$
$$= \frac{\sqrt{2}}{2}*q$$

where L(C3-S) represents the length of line C3-S. Then, the length of line Q-R can be determined by the following formula:

$$L(Q-R) = p*\sin(45°) \quad (42)$$
$$= \frac{\sqrt{2}}{2}*p$$

where L(Q-R) represents the length of line Q-R. Finally, by adding the results of equations (41) and (42), offset u can be determined as:

$$u = L(C3-S) + L(Q-R) \quad (43)$$
$$= \frac{\sqrt{2}}{2}*q + \frac{\sqrt{2}}{2}*p$$
$$= \frac{\sqrt{2}}{2}*(p+q)$$

In a similar manner, it can be seen that offset v can be calculated by subtracting the length of the line defined by reference points Q and S (hereinafter line Q-S) from the length of the line defined by output pixel R1 and reference point R (hereinafter line R1-R). From the geometry depicted in FIG. 12a, the length of line R1-R can be determined by using the following formula:

$$L(R1-R) = p*\cos(45°) \quad (44)$$
$$= \frac{\sqrt{2}}{2}*p$$

where L(R1-R) represents the length of line R1-R. Then, the length of line Q-S can be determined by the following formula:

$$L(Q-S) = q*\sin(45°) \quad (45)$$
$$= \frac{\sqrt{2}}{2}*q$$

where L(Q-S) represents the length of line Q-S. Finally, by subtracting equation (45) from equation (44), offset v can be determined as:

$$v = L(R1-R) - L(Q-S) \quad (46)$$
$$= \frac{\sqrt{2}}{2}*p - \frac{\sqrt{2}}{2}*q$$
$$= \frac{\sqrt{2}}{2}*(p-q)$$

To complete the characterization of output pixel R1 in this new frame of reference, offsets u and v need to be normalized. Offset u can be normalized as follows:

$$u' = u/L(C3 - D4) \quad (47)$$
$$= \frac{\sqrt{2}}{2} * (p+q) / \sqrt{2}$$
$$= \frac{1}{2} * (p+q)$$

where u' is the normalized value of offset u, and L(C3–D4) is the length of the line defined by pixels C3 and D4. Offset v can be normalized as follows:

$$v' = u/(L(D3 - C4)/2) \quad (48)$$
$$= \frac{\sqrt{2}}{2} * (p-q) / \frac{\sqrt{2}}{2}$$
$$= p - q$$

where v' is the normalized value of offset v, and L(D3–C4) is the length of the line defined by pixels D3 and C4. Note that because offset v is measured from axis X', which intersects the midpoint of pixels C3, C4, D3, and D4, offset v is normalized by half of the distance between pixels D3 and C4.

Figure 12B:
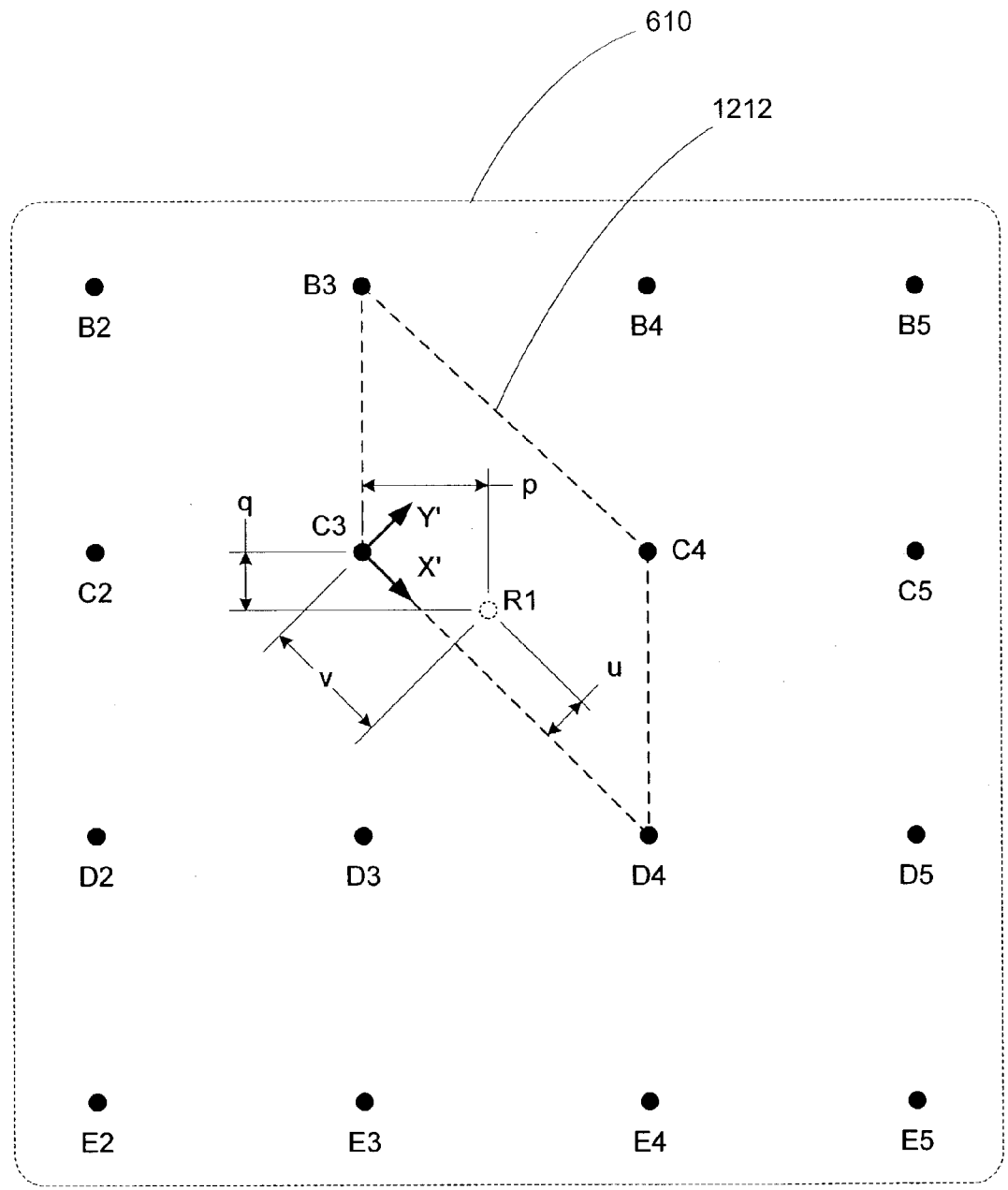

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 12b shows a detail view of enhanced pixel set 610 from FIG. 6, incorporating the rotated frame of reference and normalized offsets calculated with respect to FIG. 12a, and including a rotated pixel set 1212 that includes original pixels B3, C3, C4, and D4. As indicated in FIG. 12b, rotated pixel set 1212 includes the four original pixels (B3, C3, C4, and D4) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(I, neg) = [V(C3)*(1-u') + V(D4)*u']*(1-v') + \quad (49)$$
$$\left[ V(C4)*\left(u' + \frac{1}{2}\right) + V(B3)*\left(1 - \left(u' + \frac{1}{2}\right)\right) \right] * v'$$

where V(I, neg) is the scaled pixel data for an output pixel located in sector I and associated with a negative slope edge, u' and v' are the normalized rotated offsets calculated in equations (47) and (48), respectively, and V(B3), V(C3), V(C4), and V(D4) are the pixel data of original pixels B3, C3, C4, and D4, respectively. Note that this is the standard bilinear interpolation function (as described with respect to equation (a)) applied to pixels B3, C3, C4, and D4, except that a correction factor of one-half is added to the u' offset for the portions of the expression involving pixels C4 and B3. This correction factor is applied to compensate for the fact that rotated pixel set 1212 forms a parallelogram, and pixels C4 and B3 are therefore offset from the Y' axis by an additional (negative) distance of one-half (normalized) in the X' axis direction.

Negative Slope, Output Pixel in Sector II

Figure 13A:
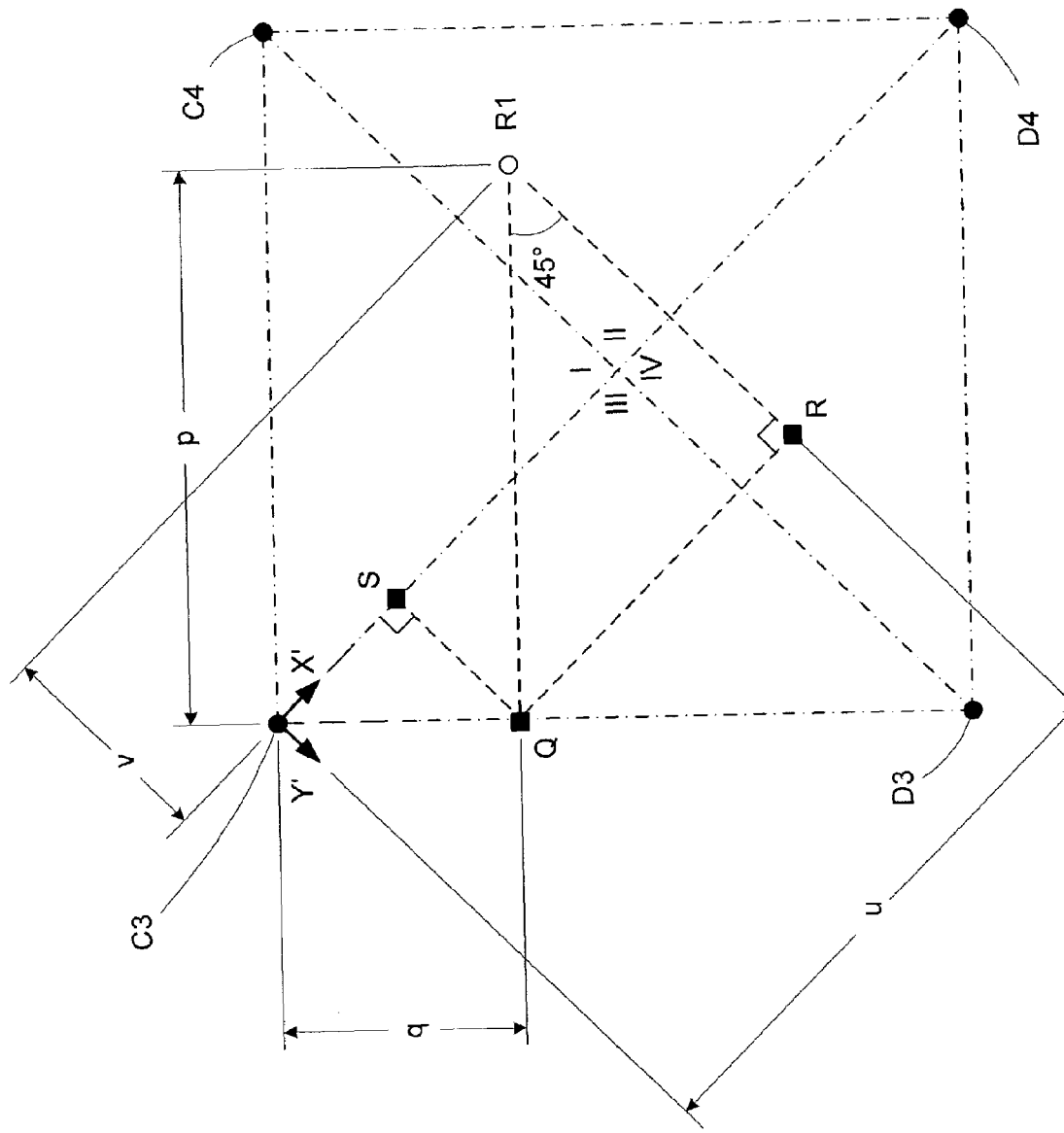

FIG. 13a presents a partial view of enhanced pixel set 610 from FIG. 6, showing output pixel R1 surrounded by four original pixels C3, C4, D3, and D4. FIG. 13a illustrates a method for specifying a rotated frame of reference for output pixel R1 associated with a negative slope diagonal edge and located in triangular sector II (i.e., the triangle defined by pixels C4, D4, and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined, with original pixel C3 selected as the origin and new axes X' and Y' angled at 45° to the original horizontal and vertical axes of the pixel array. Note that axis X' is parallel to the line formed by original pixels C3 and D4, while axis Y' is parallel to the line formed by original pixels D3 and C4.

Once the new axes have been defined, the position of output pixel R1 can be specified with respect to these new axes by determining offsets u along the X' axis and v along the Y' axis, both offsets being taken from the location of original pixel C3. To calculate these offsets, reference points Q, R, and S can be defined. Reference point Q represents the point at which a horizontal line originating from output pixel R1 intersects the line defined by original pixels C3 and D3. Reference point R represents the point at which a line parallel to axis X' and originating from point Q intersects a line parallel to axis Y' and originating from output pixel R1. Finally, reference point S represents the point at which a line parallel to axis Y' and originating from reference point Q intersects the line defined by original pixels C3 and D4.

Using the aforementioned reference points Q, R, and S, it can be seen that offset u can be calculated by adding the lengths of the line defined by pixel C3 and reference point S (hereinafter referred to as line C3-S), and the line defined by reference points Q and R (hereinafter referred to as line Q-R). From the geometry depicted in FIG. 13a, the length of line C3-S can be determined by using the following formula:

$$L(C3 - S) = q * \cos(45°) \quad (50)$$
$$= \frac{\sqrt{2}}{2} * q$$

where L(C3-S) represents the length of line C3-S. Then, the length of line Q-R can be determined by the following formula:

$$L(Q - R) = p * \sin(45°) \quad (51)$$
$$= \frac{\sqrt{2}}{2} * p$$

where L(Q-R) represents the length of line Q-R. Finally, by adding the results of equations (50) and (51), offset u can be determined as:

$$u = L(C3 - S) + L(Q - R) \qquad (52)$$
$$= \frac{\sqrt{2}}{2} * q + \frac{\sqrt{2}}{2} * p$$
$$= \frac{\sqrt{2}}{2} * (p + q)$$

In a similar manner, it can be seen that offset v can be calculated by subtracting the length of the line defined by reference points Q and S (hereinafter line Q-S) from the length of the line defined by output pixel R1 and reference point R (hereinafter line R1-R). From the geometry depicted in FIG. 13a, the length of line R1-R can be determined by using the following formula:

$$L(R1 - R) = p * \cos(45°) \qquad (53)$$
$$= \frac{\sqrt{2}}{2} * p$$

where L(R1-R) represents the length of line R1-R. Then, the length of line Q-S can be determined by the following formula:

$$L(Q - S) = q * \sin(45°) \qquad (54)$$
$$= \frac{\sqrt{2}}{2} * q$$

where L(Q-S) represents the length of line Q-S. Finally, by subtracting equation (54) from equation (53), offset v can be determined as:

$$v = L(R1 - R) - L(Q - S) \qquad (55)$$
$$= \frac{\sqrt{2}}{2} * p - \frac{\sqrt{2}}{2} * q$$
$$= \frac{\sqrt{2}}{2} * (p - q)$$

To complete the characterization of output pixel R1 in this new frame of reference, offsets u and v need to be normalized. Offset u can be normalized as follows:

$$u' = u/L(C3 - D4) \qquad (56)$$
$$= \frac{\sqrt{2}}{2} * (p + q)/\sqrt{2}$$
$$= \frac{1}{2} * (p + q)$$

where u' is the normalized value of offset u, and L(C3–D4) is the length of the line defined by pixels C3 and D4. Offset v can be normalized as follows:

$$v' = u/(L(D3 - C4)/2) \qquad (57)$$
$$= \frac{\sqrt{2}}{2} * (p - q) \Big/ \frac{\sqrt{2}}{2}$$
$$= p - q$$

where v' is the normalized value of offset v, and L(D3–C4) is the length of the line defined by pixels D3 and C4. Note that because offset v is measured from axis X', which intersects the midpoint of pixels C3, C4, D3, and D4, offset v is normalized by half of the distance between pixels D3 and C4.

Figure 13B:
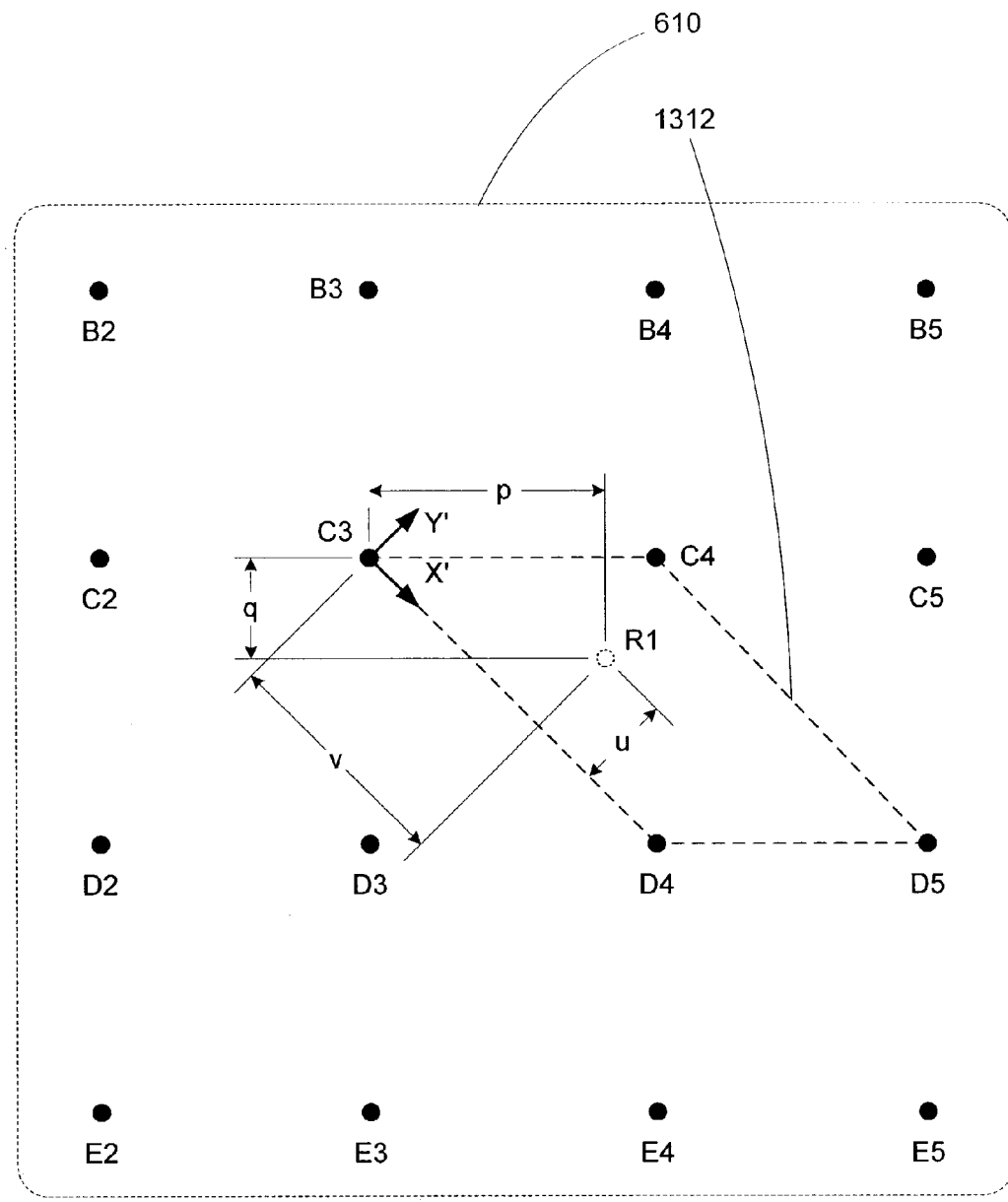

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 13b shows a detail view of enhanced pixel set 610 from FIG. 6, incorporating the rotated frame of reference and normalized offsets calculated with respect to FIG. 13a, and including a rotated pixel set 1312 that includes original pixels C3, C4, D4, and D5. As indicated in FIG. 13b, rotated pixel set 1312 includes the four original pixels (C3, C4, D4, and D5) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(II, neg) = [V(C3) * (1 - u') + V(D4) * u'] * (1 - v') + \qquad (49)$$
$$\left[V(C4) * \left(1 - \left(u' - \frac{1}{2}\right)\right) + V(D5) * \left(u' - \frac{1}{2}\right)\right] * v'$$

where V(II, neg) is the scaled pixel data for an output pixel located in sector II and associated with a negative slope edge, u' and v' are the normalized rotated offsets calculated in equations (47) and (48), respectively, and V(C3), V(C4), V(D4), and V(D5) are the pixel data of original pixels C3, C4, D4, and D5, respectively. Note that this is the standard bilinear interpolation function (as described with respect to equation (a)) applied to pixels C3, C4, D4, and D5, except that a correction factor of one-half is subtracted from the u' offset for the portions of the expression involving pixels C4 and D5. This correction factor is applied to compensate for the fact that rotated pixel set 1312 forms a parallelogram, and pixels C4 and D5 are therefore offset from the Y' axis by an additional distance of one-half (normalized) in the X' axis direction.

Negative Slope, Output Pixel in Sector III

Figure 14A:
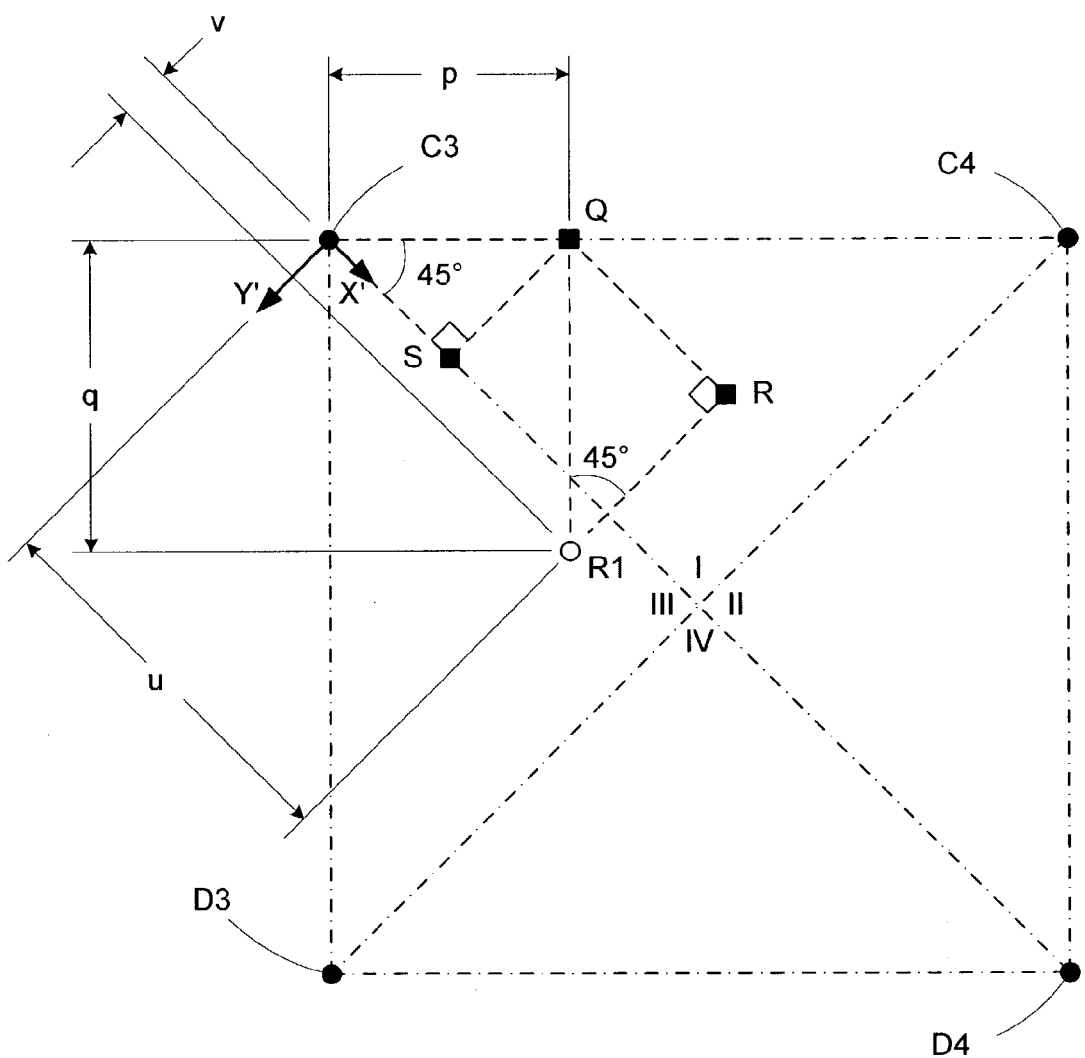

FIG. 14a presents a partial view of enhanced pixel set 610 from FIG. 6, showing output pixel R1 surrounded by four original pixels C3, C4, D3, and D4. FIG. 14a illustrates a method for specifying a rotated frame of reference for output pixel R1 associated with a negative slope diagonal edge and located in triangular sector III (i.e., the triangle defined by pixels C3, D3 and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined, with original pixel C3 selected as the origin and new axes X' and Y' angled at 45° to the original horizontal and vertical axes of the pixel array. Note that axis X' is parallel to the line formed by original pixels C3 and D4, while axis Y' is parallel to the line formed by original pixels D3 and C4.

Once the new axes have been defined, the position of output pixel R1 can be specified with respect to these new axes by determining offsets u along the X' axis and v along the Y' axis, both offsets being taken from the location of original pixel C3. To calculate these offsets, reference points Q, R, and S can be defined. Reference point Q represents the point at which a vertical line originating from output pixel R1 intersects the line defined by original pixels C3 and C4. Reference point R represents the point at which a line parallel to axis X' and originating from point Q intersects a line parallel to axis Y' and originating from output pixel R1. Finally, reference point S represents the point at which a line parallel to axis Y' and originating from reference point Q intersects the line defined by original pixels C3 and D4.

Using the aforementioned reference points Q, R, and S, it can be seen that offset u can be calculated by adding the lengths of the line defined by pixel C3 and reference point S (hereinafter referred to as line C3-S), and the line defined by reference points Q and R (hereinafter referred to as line Q-R). From the geometry depicted in FIG. 14a, the length of line C3-S can be determined by using the following formula:

$$L(C3 - S) = p * \cos(45°) \qquad (50)$$
$$= \frac{\sqrt{2}}{2} * p$$

where L(C3-S) represents the length of line C3-S. Then, the length of line Q-R can be determined by the following formula:

$$L(Q - R) = q * \sin(45°) \qquad (51)$$
$$= \frac{\sqrt{2}}{2} * q$$

where L(Q-R) represents the length of line Q-R. Finally, by adding the results of equations (50) and (51), offset u can be determined as:

$$u = L(C3 - S) + L(Q - R) \qquad (52)$$
$$= \frac{\sqrt{2}}{2} * p + \frac{\sqrt{2}}{2} * q$$
$$= \frac{\sqrt{2}}{2} * (p + q)$$

In a similar manner, it can be seen that offset v can be calculated by subtracting the length of the line defined by reference points Q and S (hereinafter line Q-S) from the length of the line defined by output pixel R1 and reference point R (hereinafter line R1-R). From the geometry depicted in FIG. 14a, the length of line R1-R can be determined by using the following formula:

$$L(R1 - R) = q * \cos(45°) \qquad (53)$$
$$= \frac{\sqrt{2}}{2} * q$$

where L(R1-R) represents the length of line R1-R. Then, the length of line Q-S can be determined by the following formula:

$$L(Q - S) = p * \sin(45°) \qquad (54)$$
$$= \frac{\sqrt{2}}{2} * p$$

where L(Q-S) represents the length of line Q-S. Finally, by subtracting equation (54) from equation (53), offset v can be determined as:

$$v = L(R1 - R) - L(Q - S) \qquad (55)$$
$$= \frac{\sqrt{2}}{2} * q - \frac{\sqrt{2}}{2} * p$$
$$= \frac{\sqrt{2}}{2} * (q - p)$$

To complete the characterization of output pixel R1 in this new frame of reference, offsets u and v need to be normalized. Offset u can be normalized as follows:

$$u' = u / L(C3 - D4) \qquad (56)$$
$$= \frac{\sqrt{2}}{2} * (p + q) / \sqrt{2}$$
$$= \frac{1}{2} * (p + q)$$

where u' is the normalized value of offset u, and L(C3–D4) is the length of the line defined by pixels C3 and D4. Offset v can be normalized as follows:

$$v' = u / (L(D3 - C4) / 2) \qquad (57)$$
$$= \frac{\sqrt{2}}{2} * (q - p) / \frac{\sqrt{2}}{2}$$
$$= q - p$$

where v' is the normalized value of offset v, and L(D3–C4) is the length of the line defined by pixels D3 and C4. Note that because offset v is measured from axis X', which intersects the midpoint of pixels C3, C4, D3, and D4, offset v is normalized by half of the distance between pixels D3 and C4.

Figure 14B:
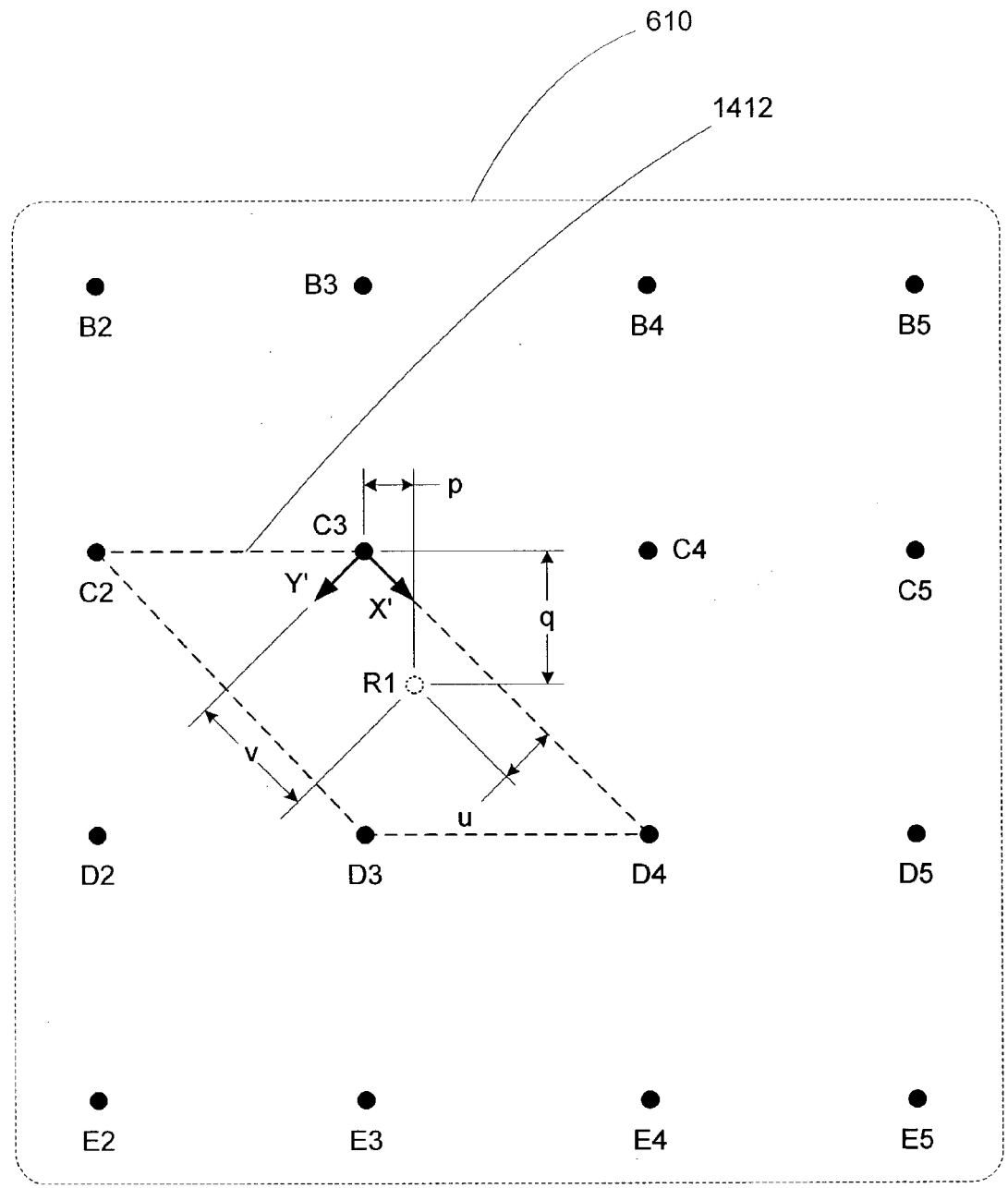

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 14b shows a detail view of enhanced pixel set 610 from FIG. 6, incorporating the rotated frame of reference and normalized offsets calculated with respect to FIG. 14a, and including a rotated pixel set 1412 that includes original pixels C2, C3, D3, and D4. As indicated in FIG. 14b, rotated pixel set 1412 includes the four original pixels (C2, C3, D3, and D4) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(III, neg) = [V(C3)*(1-u') + V(D4)*u']*(1-v') + \left[V(D3)*\left(u'+\frac{1}{2}\right) + V(C2)*\left(1-\left(u'+\frac{1}{2}\right)\right)\right]*v' \quad (58)$$

where V(III, neg) is the scaled pixel data for an output pixel located in sector III and associated with a negative slope edge, u' and v' are the normalized rotated offsets calculated in equations (56) and (57), respectively, and V(C2), V(C3), V(D3), and V(D4) are the pixel data of original pixels C2, C3, D3, and D4, respectively. Note that this is the standard bilinear interpolation function (as described with respect to equation (a)) applied to pixels C2, C3, D3, and D4, except that a correction factor of one-half is added to the u' offset for the portions of the expression involving pixels C2 and D3. This correction factor is applied to compensate for the fact that rotated pixel set 1412 forms a parallelogram, and pixels C2 and D3 are therefore offset from the Y' axis by an additional (negative) distance of one-half (normalized) in the X' axis direction.

Negative Slope, Output Pixel in Sector IV

Figure 15A:
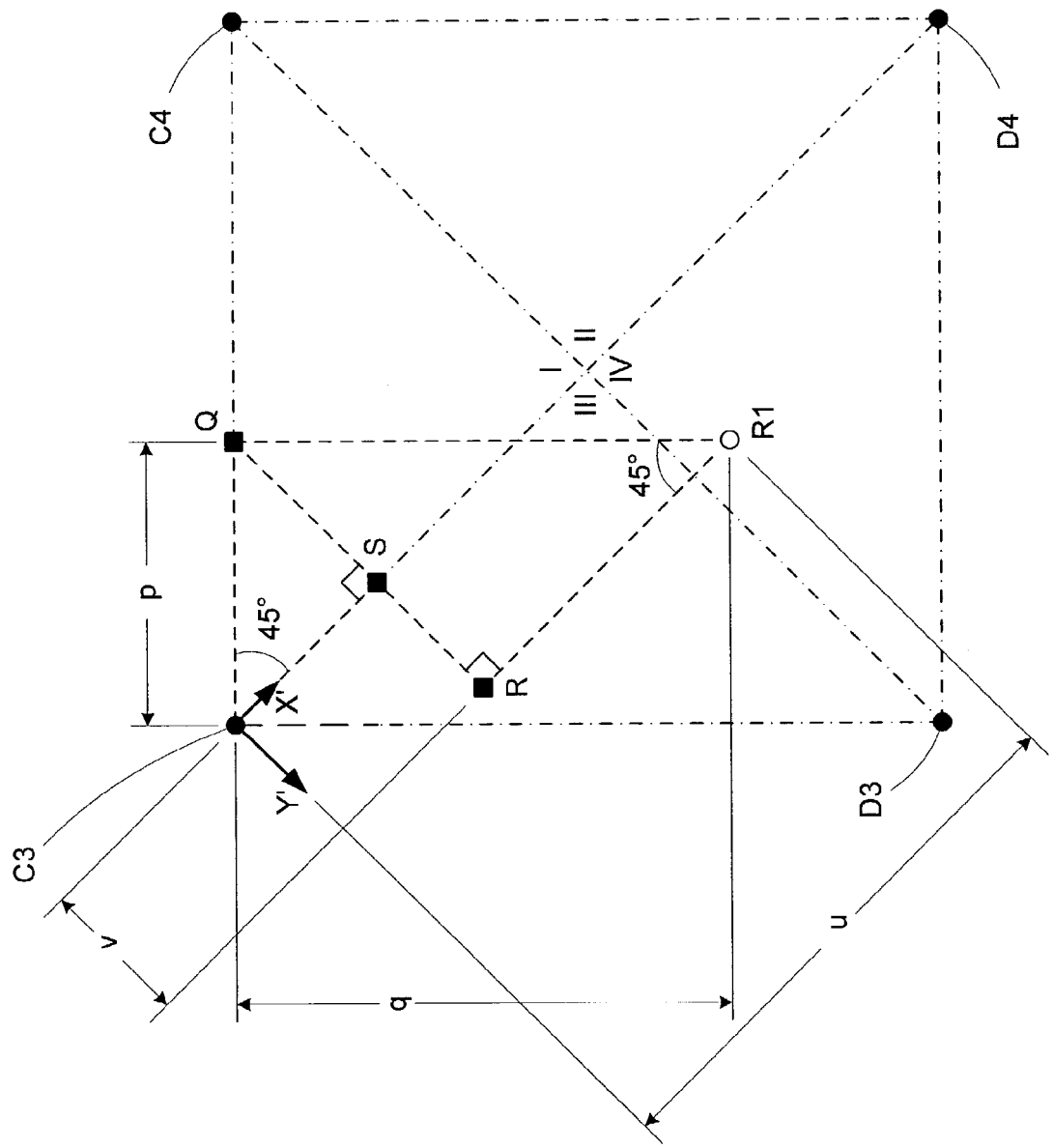

FIG. 15a presents a partial view of enhanced pixel set 610 from FIG. 6, showing output pixel R1 surrounded by four original pixels C3, C4, D3, and D4. FIG. 15a illustrates a method for specifying a rotated frame of reference for output pixel R1 associated with a negative slope diagonal edge and located in triangular sector IV (i.e., the triangle defined by pixels D3, D4 and the midpoint of pixels C3, C4, D3, and D4), according to an embodiment of the invention.

First, the position of output pixel R1 is determined with respect to original pixel C3, as noted by the horizontal offset p and the vertical offset q. Since the locations of original pixel C3 and output pixel R1 are both defined with respect to the original (rectangular) frame of reference, offsets p and q can be readily determined.

The rotated frame of reference is then defined, with original pixel C3 selected as the origin and new axes X' and Y' angled at 45° to the original horizontal and vertical axes of the pixel array. Note that axis X' is parallel to the line formed by original pixels C3 and D4, while axis Y' is parallel to the line formed by original pixels D3 and C4.

Once the new axes have been defined, the position of output pixel R1 can be specified with respect to these new axes by determining offsets u along the X' axis and v along the Y' axis, both offsets being taken from the location of original pixel C3. To calculate these offsets, reference points Q, R, and S can be defined. Reference point Q represents the point at which a vertical line originating from output pixel R1 intersects the line defined by original pixels C3 and C4. Reference point R represents the point at which a line parallel to axis Y' and originating from point Q intersects a line parallel to axis X' and originating from output pixel R1. Finally, reference point S represents the point at which a line parallel to axis Y' and originating from reference point Q intersects the line defined by original pixels C3 and D4.

Using the aforementioned reference points Q, R, and S, it can be seen that offset u can be calculated by adding the lengths of the line defined by pixel C3 and reference point S (hereinafter referred to as line C3-S), and the line defined by output pixel R1 and reference point R (hereinafter referred to as line R1-R). From the geometry depicted in FIG. 15a, the length of line C3-S can be determined by using the following formula:

$$L(C3-S) = p*\cos(45°) \quad (59)$$
$$= \frac{\sqrt{2}}{2}*p$$

where L(C3-S) represents the length of line C3-S. Then, the length of line R1-R can be determined by the following formula:

$$L(R1-R) = q*\cos(45°) \quad (60)$$
$$= \frac{\sqrt{2}}{2}*q$$

where L(R1-R) represents the length of line R1-R. Finally, by adding the results of equations (59) and (60), offset u can be determined as:

$$u = L(C3-S) + L(R1-R) \quad (61)$$
$$= \frac{\sqrt{2}}{2}*p + \frac{\sqrt{2}}{2}*q$$
$$= \frac{\sqrt{2}}{2}*(p+q)$$

In a similar manner, it can be seen that offset v can be calculated by subtracting the length of the line defined by reference points Q and S (hereinafter line Q-S) from the length of the line defined by reference points Q and R (hereinafter line Q-R). From the geometry depicted in FIG. 15a, the length of line Q-R can be determined by using the following formula:

$$L(Q-R) = q*\sin(45°) \quad (62)$$
$$= \frac{\sqrt{2}}{2}*q$$

where L(RQ-R) represents the length of line Q-R. Then, the length of line Q-S can be determined by the following formula:

$$L(Q-S) = p * \sin(45°) \quad (63)$$
$$= \frac{\sqrt{2}}{2} * p$$

where L(Q-S) represents the length of line Q-S. Finally, by subtracting equation (63) from equation (62), offset v can be determined as:

$$v = L(Q-R) - L(Q-S) \quad (64)$$
$$= \frac{\sqrt{2}}{2} * q - \frac{\sqrt{2}}{2} * p$$
$$= \frac{\sqrt{2}}{2} * (q-p)$$

To complete the characterization of output pixel R1 in this new frame of reference, offsets u and v need to be normalized. Offset u can be normalized as follows:

$$u' = u / L(C3 - D4) \quad (65)$$
$$= \frac{\sqrt{2}}{2} * (p+q)\sqrt{2}$$
$$= \frac{1}{2} * (p+q)$$

where u' is the normalized value of offset u, and L(C3–D4) is the length of the line defined by pixels C3 and D4. Offset v can be normalized as follows:

$$v' = u / (L(D3 - C4)/2) \quad (66)$$
$$= \frac{\sqrt{2}}{2} * (q-p) / \frac{\sqrt{2}}{2}$$
$$= q - p$$

where v' is the normalized value of offset v, and L(D3–C4) is the length of the line defined by pixels D3 and C4. Note that because offset v is measured from axis X', which intersects the midpoint of pixels C3, C4, D3, and D4, offset v is normalized by half of the distance between pixels D3 and C4.

Figure 15B:
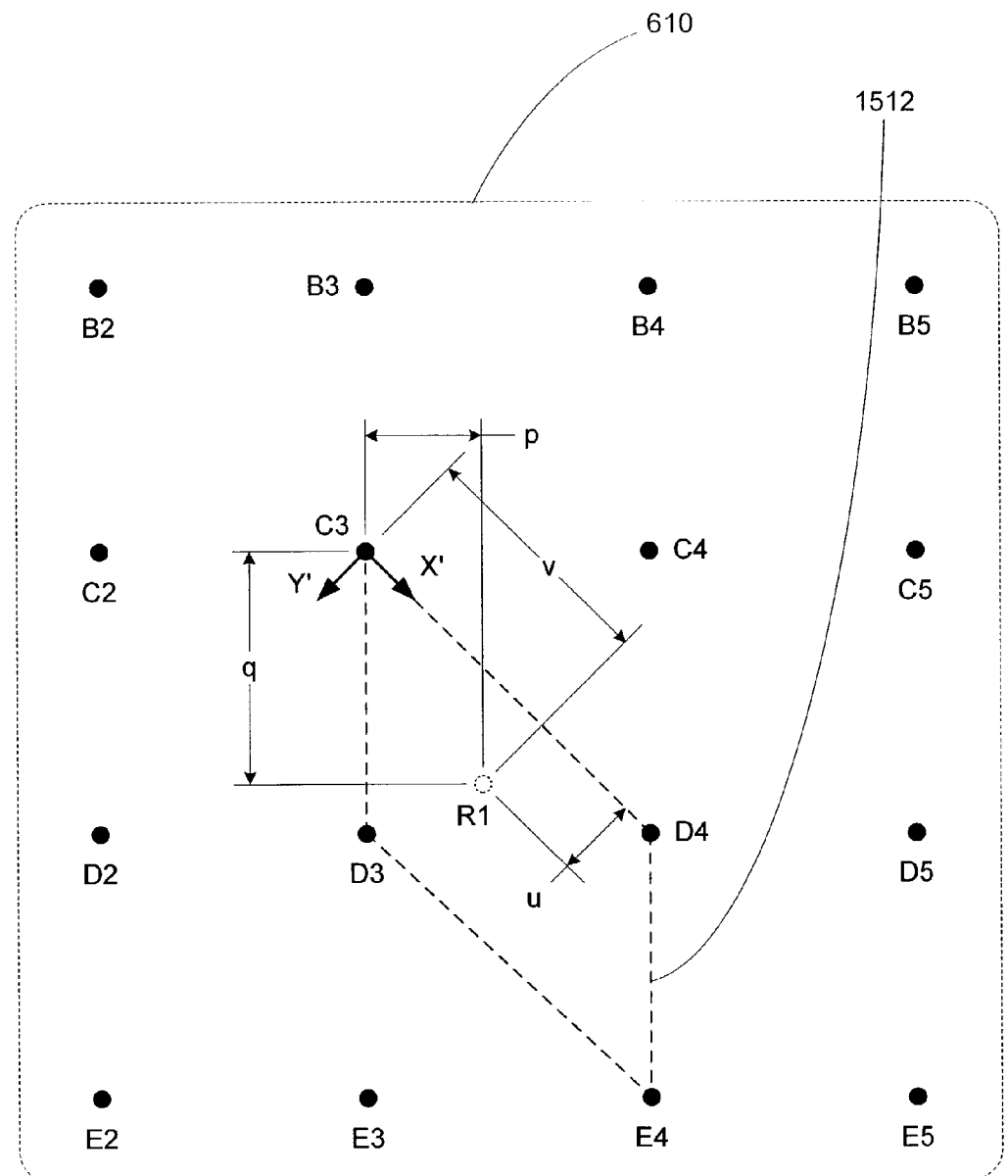

Once normalized offsets u' and v' have been calculated, a rotated pixel set for the bilinear interpolation operation can be selected. Once again, the selection of this rotated pixel set is dependent on the position of the output pixel and the slope of its associated edge. FIG. 15b shows a detail view of enhanced pixel set 610 from FIG. 6, incorporating the rotated frame of reference and normalized offsets calculated with respect to FIG. 15a, and including a rotated pixel set 1512 that includes original pixels C3, D3, D4, and E4. As indicated in FIG. 15b, rotated pixel set 1512 includes the four original pixels (C3, D3, D4, and E4) that most closely surround output pixel R1 as a parallelogram in the rotated frame of reference specified by axes X' and Y', two sides of the parallelogram being parallel to axis X'. Then, applying the bilinear interpolation formula to the rotated pixel set produces the formula:

$$V(IV, neg) = [V(C3)*(1-u') + V(D4)*u']*(1-v') + \quad (67)$$
$$\left[V(D3)*\left(1-\left(u'-\frac{1}{2}\right)\right) + \right.$$
$$\left. V(E4)*\left(u'-\frac{1}{2}\right)\right]*v'$$

where V(IV, neg) is the scaled pixel data for an output pixel located in sector IV and associated with a negative slope edge, u' and v' are the normalized rotated offsets calculated in equations (65) and (66), respectively, and V(C3), V(D3), V(D4), and V(E4) are the pixel data of original pixels C3, D3, D4, and E4, respectively. Note that this is the standard bilinear interpolation function (as described with respect to equation (a)) applied to pixels C3, D3, D4, and E4, except that a correction factor of one-half is subtracted from the u' offset for the portions of the expression involving pixels D3 and E4. This correction factor is applied to compensate for the fact that rotated pixel set 1512 forms a parallelogram, and pixels D3 and E4 are therefore offset from the Y' axis by an additional distance of one-half (normalized) in the X' axis direction.

Digital Image Scaling System

Figure 16:
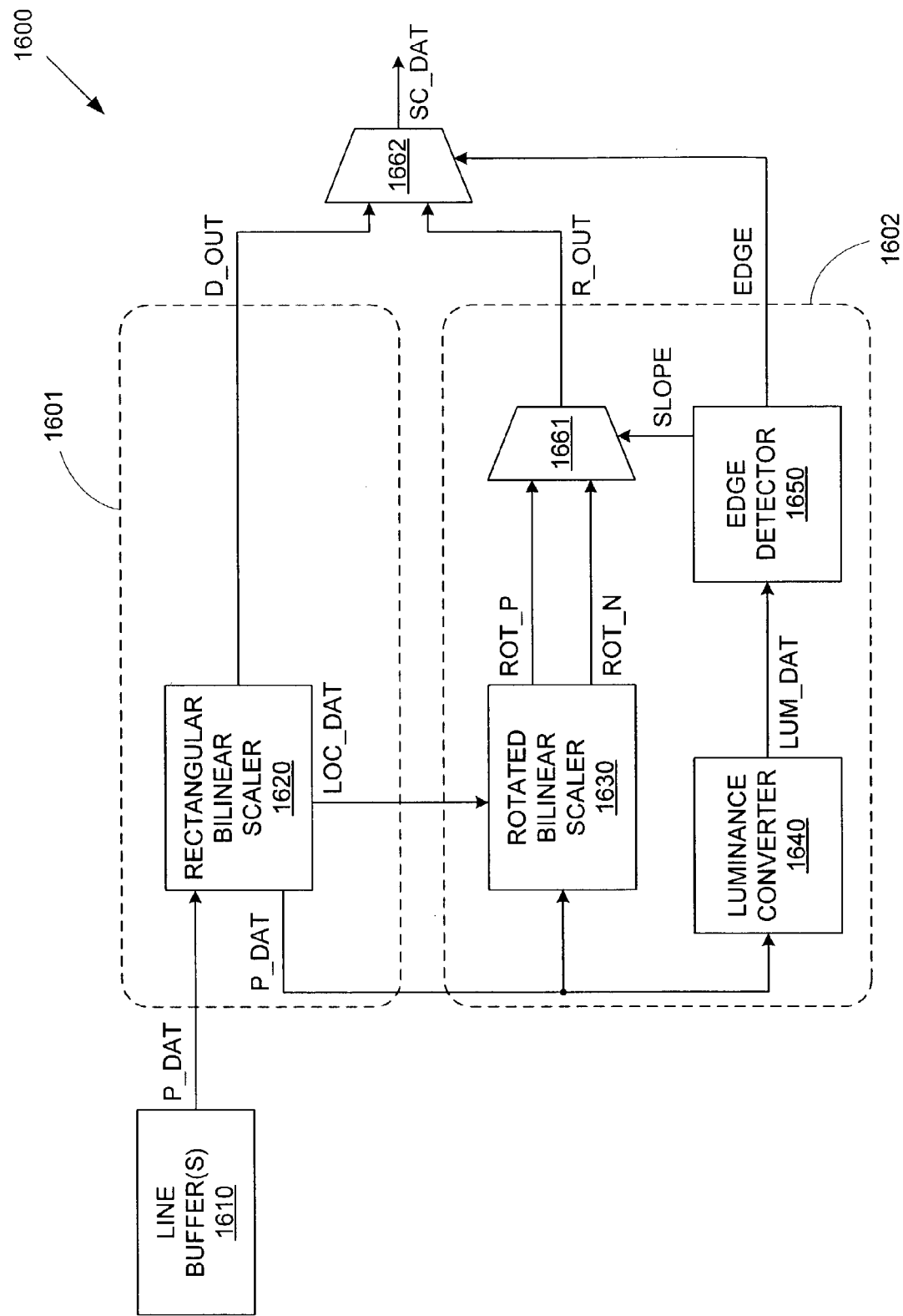
FIG. 16 is a block diagram of a digital image scaling system in accordance with an embodiment of the invention.

FIG. 16 is a block diagram of a digital image scaling system 1600 in accordance with an embodiment of the invention. Digital image scaling system 1600 comprises one or more line buffers 1610, a default scaler 1601, a diagonal edge scaler 1602, and an output multiplexer 1662. Default scaler receives raw pixel data (e.g., positional information, RGB data, etc.) associated with a selected output pixel from line buffer(s) 1610 and performs an orthogonal edge-based scaling operation on that raw data to generate a default scaled output D_OUT. Meanwhile, diagonal edge scaler 1602 performs a diagonal edge-based scaling operation on raw pixel data P_DAT to generate a rotated scaled output R_OUT. Diagonal edge scaler 1602 also performs an edge detection operation and asserts an edge detection signal EDGE when a diagonal edge is detected. Output multiplexer 1662 is coupled to receive default scaled output D_OUT and rotated scaled output R_OUT as inputs, and is further configured to receive edge detection signal EDGE as a control signal. When signal EDGE is asserted, multiplexer 1662 passes rotated scaled output R_OUT as scaled pixel data SC_DAT; otherwise, multiplexer 1662 passes default bilinear interpolation output D_OUT as scaled pixel data SC_DAT. Scaled pixel data SC_DAT is then assigned to the output pixel and the process for the next output pixel begins.

According to an embodiment of the invention, default scaler 1601 comprises a rectangular bilinear scaler 1620, while diagonal edge scaler 1602 comprises a rotated bilinear scaler 1630, a luminance converter 1640, an edge detector 1650, and a multiplexer 1661. Rectangular bilinear scaler 1620 is configured to perform rectangular bilinear scaling on raw pixel data P_DAT to generate default scaled output D_OUT. Rectangular bilinear scaler 1620 also passes raw pixel data P_DAT to rotated bilinear scaler 1630 and luminance converter 1640. Because bilinear scaler 1620 distributes the raw pixel data in this manner, additional line buffers are not required for rotated bilinear scaler 1630 and luminance converter 1640, thereby minimizing the cost of scaling system 1600. Luminance converter 1640 converts the RGB pixel data into luminance data LUM_DAT, and passes this information to edge detector 1650.

Meanwhile, rotated bilinear scaler 1630 is configured to receive output pixel positional data LOC_DAT from standard bilinear scaler 1620. Using positional data LOC_DAT, rotated bilinear scaler 1630 applies a rotated bilinear interpolation process to raw pixel data P_DAT for both a positive slope edge and a negative slope edge, generating a positive slope rotated bilinear interpolation output ROT_P and a negative slope rotated bilinear interpolation output ROT_N, respectively. This rotated bilinear scaling is performed in substantially the same manner as described above, where positional data LOC_DAT specifies the p and q offsets. Note that the bilinear scaling is performed for each of the red, green and blue components of raw pixel data P_DAT.

Using luminance data LUM_DAT, edge detector 1650 determines whether or not the output pixel is associated with an edge and whether that edge has a positive or negative slope. This edge detection can be performed in substantially the same manner as described above. If a diagonal edge is detected, edge detector 1650 asserts edge detection signal EDGE. Edge detector also asserts a slope indicator signal SLOPE when the slope of the edge is positive, and deasserts slope indicator signal SLOPE when the slope of the edge is negative.

Multiplexer 1661 is coupled to receive as inputs positive slope rotated bilinear interpolation output ROT_P and negative slope rotated bilinear interpolation output ROT_N, and is further configured to receive slope indicator signal SLOPE as a control signal. If signal SLOPE is asserted, multiplexer 1661 passes positive slope rotated bilinear interpolation output ROT_P as rotated scaled output R_OUT. If signal SLOPE is deasserted, multiplexer 1661 passes otherwise, multiplexer 1660 passes negative slope rotated bilinear interpolation output ROT_N as rotated scaled output R_OUT. Then, as described previously, output multiplexer 1662 then provides one of rotated scaled output R_OUT and default scaled output D_OUT as scaled pixel data SC_DAT to be assigned to the output pixel and the scaling process for the next output pixel begins. According to an embodiment of the invention, multiplexer 1661 could be incorporated into edge detector 1650, wherein edge detector 1650 would then perform the selection of either positive slope rotated bilinear interpolation output ROT_P or negative slope rotated bilinear interpolation output ROT_N as rotated scaled output R_OUT.

Note that because scaling system 1600 concurrently applies standard bilinear scaling and rotated bilinear scaling, edge detector 1650 could be used to dynamically disable the bilinear scaling portion by forcing edge detection signal EDGE to remain a deasserted state. Then, scaling system 1600 would operate as a conventional bilinear scaling system. To activate the rotated bilinear scaling capabilities, edge detector 1650 could release the hold on edge detection signal EDGE, in which case scaling system 1600 would function as described previously.

The various embodiments of the structures and methods of this invention that are described above are illustrative only of the principles of this invention and are not intended to limit the scope of the invention to the particular embodiments described. Thus, the invention is limited only by the following claims.

We claim:

1. A method for producing an enlarged image from an original image, the enlarged image comprising a plurality of output pixels and the original image comprising a plurality of original pixels, the method comprising:
   selecting a location for a first output pixel;
   determining whether the first output pixel is associated with a diagonal edge in the original image by:
   selecting a rectangular array of original pixels around the first output pixel;
   generating a first edge strength value; and
   comparing the first edge strength value against a threshold strength value; and
   applying a rotated bilinear scaling operation to assign scaled pixel data to the first output pixel when the first output pixel is associated with the diagonal edge.

2. The method of claim 1, further comprising applying a standard bilinear scaling operation to assign scaled pixel data to the first output pixel when the first output pixel is not associated with the diagonal edge.

3. The method of claim 1, wherein determining whether the first output pixel is associated with the diagonal edge further comprises:
   generating a second edge strength value; and
   comparing the second edge strength value against the threshold strength value.

4. The method of claim 3, wherein generating the first edge strength value comprises:
   defining a first matrix of weighted values;
   multiplying each original pixel of the rectangular array by a corresponding weighted value from the first matrix to form a first plurality of weighted products; and
   summing and taking the absolute value of the first plurality of weighted products to generate the first edge strength value.

5. The method of claim 4, wherein generating the second edge strength value comprises:
   defining a second matrix of weighted values;
   multiplying each original pixel of the rectangular array by a corresponding weighted value from the second matrix to form a second plurality of weighted products; and
   summing and taking the absolute value of the second plurality of weighted products to generate the second edge strength value.

6. The method of claim 5, wherein the rectangular array comprises sixteen original pixels.

7. The method of claim 6, wherein the first matrix includes a first 4×4 array of cells, the first 4×4 array of cells comprising:
   a first diagonal line of cells running upwards though the center of the first 4×4 array of cells;
   a first plurality of signed cells positioned above the first diagonal line, each of the first plurality of signed cells being assigned a value having a first sign; and
   a second plurality of signed cells positioned below the first diagonal line, each of the second plurality of signed cells having a second sign, the second sign being opposite to the first sign.

8. The method of claim 4, wherein the second matrix includes a second 4×4 array of cells, the second 4×4 array of cells comprising:
   a second diagonal line of cells running downwards through the center of the second 4×4 array of cells;
   a third plurality of signed cells positioned above the second diagonal line, each of the third plurality of signed cells having the first sign; and
   a fourth plurality of signed cells positioned below the second diagonal line, each of the fourth plurality of signed cells having the second sign.

9. A method for producing an enlarged image from an original image, the enlarged image comprising a plurality of output pixels and the original image comprising a plurality of original pixels, the method comprising:

selecting a location for a first output pixel;
determining whether the first output pixel is associated with a diagonal edge in the original image;
applying a rotated bilinear scaling operation to assign scaled pixel data to the first output pixel when the first output pixel is associated with the diagonal edge; and
wherein the plurality of original pixels are arranged in a plurality of rows and columns, the plurality of rows being parallel to a first axis and the plurality of columns being parallel to a second axis, wherein the first axis and the second axis are orthogonal, wherein the rotated bilinear scaling operation comprises:
specifying a rotated frame of reference, the rotated frame of reference being defined by a third axis and a fourth axis, wherein the third axis and the fourth axis are orthogonal;
selecting a rotated pixel set from the plurality of original pixels, the rotated pixel set comprising four original pixels forming a parallelogram surrounding the first output pixel, the parallelogram, having two sides parallel to the third axis; and
creating a weighted average using pixel data from the rotated pixel set and distances defined with respect to the rotated frame of reference to generate the scaled pixel data.

10. The method of claim 9, wherein the third axis and the fourth axis are rotated 45 degrees from the first axis and the second axis, respectively.

11. The method of claim 10, wherein when the diagonal edge has a positive slope, the third axis is given a 45° slope.

12. The method of claim 10, wherein when the diagonal edge has a negative slope, the third axis is given a −45° slope.

13. The method of claim 9, wherein the rotated pixel set comprises a first pixel, a second pixel, a third pixel, and a fourth pixel, the first pixel and the second pixel being aligned with the third axis, the third pixel being offset from the fourth axis in the direction of the third axis by a normalized first distance, wherein creating a weighted average comprises:
specifying a first offset that defines the position of the first output pixel with respect to the third axis;
specifying a second offset that defines the position of the first output pixel with respect to the fourth axis;
normalizing the first offset to generate a first normalized offset;
normalizing the second offset to generate a second normalized offset; and
applying a modified bilinear interpolation function to the rotated pixel set using the first normalized offset and the second normalized offset, wherein the modified bilinear interpolation function is substantially similar to a standard bilinear interpolation function except that in product terms involving the third pixel and the fourth pixel, the first offset is adjusted by the normalized first distance.

14. The method of claim 13, further comprising selecting a 2×2 reference pixel set from the plurality of original pixels, the 2×2 reference pixel set surrounding the first output pixel and including a first reference pixel, a second reference pixel, a third reference pixel and a fourth reference pixel,
wherein the first reference pixel, the second reference pixel, the third reference pixel, and the fourth reference pixel have define a reference midpoint,
wherein the first reference pixel, the second reference pixel, and the reference midpoint define a first triangular sector,
wherein the second reference pixel, the fourth reference pixel, and the reference midpoint define a second triangular sector,
wherein the first reference pixel, the third reference pixel, and the reference midpoint define a third triangular sector, and
wherein the third reference pixel, the fourth reference pixel, and the reference midpoint define a fourth triangular sector.

15. The method of claim 14, the first output pixel having a third offset in the direction of the first axis from the first reference pixel and a fourth offset in the direction of the second axis from the first reference pixel,
wherein when the diagonal edge has a positive slope and the first output pixel is in the first triangular sector or the third triangular sector, the first normalized offset is equal to one half of one plus the third offset minus the fourth offset, and the second normalized offset is equal to one minus the third offset and the fourth offset, and
wherein when the diagonal edge has a positive slope and the first output pixel is in the second triangular sector or the fourth triangular sector, the first normalized offset is equal to one half of one plus the third offset minus the fourth offset, and the second normalized offset is equal to the third offset plus the fourth offset minus one, and
wherein when the diagonal edge has a negative slope and the first output pixel is in the first triangular sector or the second triangular sector, the first normalized offset is equal to one half of the third offset plus the fourth offset, and the second normalized offset is equal to the third offset minus the fourth offset, and
wherein when the diagonal edge has a negative slope and the first output pixel is in the third triangular sector or the fourth triangular sector, the first normalized offset is equal to one half of the third offset plus the fourth offset, and the second normalized offset is equal to the fourth offset minus the third offset.

16. A digital image scaler for upscaling an original digital image, the digital image scaler comprising:
at least one line buffer for providing raw pixel data from the original digital image associated with an output pixel;
a standard bilinear scaler for applying standard bilinear interpolation to the raw pixel data to generate a standard scaled output;
a rotated bilinear scaler for applying rotated bilinear interpolation to the raw pixel data to generate a rotated scaled output; and
an output selector circuit for assigning either the standard scaled output or the rotated scaled output to the output pixel;
wherein the rotated bilinear scaler comprises:
a reference frame generator for generating a rotated frame of reference relative to the original digital image;
an output pixel locator for positioning an output pixel at a location within the rotated frame of reference;
a rotated pixel set selector for selecting a rotated pixel set from the original digital image, the rotated pixel set defining a parallelogram surrounding the location of the output pixel in the rotated frame of reference; and
a weighted average generator for calculating a weighted average of the raw data from the rotated pixel set within the rotated frame of reference.

17. The digital image scaler of claim 16, wherein the raw pixel data comprises RGB data, the digital image scaler further comprising:
- a luminance converter for converting RGB data from the raw pixel data into luminance data; and
- an edge detector configured to analyze the luminance data for diagonal edges.

18. The digital image scaler of claim 17, wherein the standard bilinear scaler comprises a location data generator for generating location data for the output pixel, and wherein the output pixel locator is configured to receive the location data.

19. The digital image scaler of claim 18, wherein the rotated bilinear scaler calculates a first scaled output and a second scaled output, wherein when the edge detector detects a positive slope diagonal edge, the edge detector sets the rotated scaled output equal to the first scaled output, and wherein when the edge detector detects a negative slope diagonal edge, the edge detector sets the rotated scaled output equal to the second scaled output.

20. The digital image scaler of claim 19, wherein the edge detector circuit asserts an edge detection signal upon detecting an edge, and wherein the output selector circuit is coupled to receive as inputs the standard scaled output and the rotated scaled output, wherein when the edge detection signal is asserted the output selector circuit selects the rotated scaled output as a final scaled output to be assigned to the output pixel, and wherein when the edge detection signal is deasserted the output selector circuit provides the standard scaled output as the final scaled output to be assigned to the output pixel.

21. The digital image scaler of claim 20, wherein the edge detector comprises logic for forcing the deassertion of the edge detection signal.

22. The digital image scaler of claim 16, wherein the standard bilinear scaler provides location information from the raw pixel data to the rotated bilinear scaler.

23. The digital image scaler of claim 17, wherein the standard bilinear scaler provides the raw pixel data to the rotated bilinear scaler and the luminance converter.

24. A system for upscaling an original digital image to generate an output image, the original digital image comprising a plurality of original pixels arranged in a rectangular array within a first frame of reference, the first frame of reference being defined by a first axis and a second axis, the first axis and the second axis being orthogonal, the system comprising:
- means for specifying a rotated frame of reference, the rotated frame of reference being defined by a third axis and a fourth axis, the third axis and the fourth axis being orthogonal;
- means for selecting a rotated pixel set from the plurality of original pixels, the rotated pixel set defining a parallelogram surrounding an output pixel of the output image, the parallelogram having two edges parallel to the third axis; and
- means for calculating a weighted average of pixel data from the rotated pixel set for the output pixel within the rotated frame of reference.

25. The system of claim 24, further comprising means for determining if the output pixel is associated with a diagonal edge in the original digital image.

26. The system of claim 25, further comprising:
- means for selecting a standard pixel set from the plurality of original pixels, the standard pixel set defining a square surrounding the output pixel, the square having a first edge and a second edge parallel to the first axis and a third edge and a fourth edge parallel to the second axis; and
- means for performing a bilinear interpolation on pixel data from the standard pixel set for the output pixel within the first frame of reference to generate a standard scaled output.

27. The system of claim 26, further comprising means for assigning the weighted average to the output pixel when the output pixel is associated with the diagonal edge, and assigning the standard scaled output to the output pixel when the output pixel is not associated with the diagonal edge.

* * * * *